US012273829B2

United States Patent
Hosseini et al.

(10) Patent No.: US 12,273,829 B2
(45) Date of Patent: Apr. 8, 2025

(54) SIDELINK FEEDBACK REPORTING

(71) Applicant: QUALCOMM Incorporated, San Diego, CA (US)

(72) Inventors: Seyedkianoush Hosseini, San Diego, CA (US); Gabi Sarkis, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 17/208,947

(22) Filed: Mar. 22, 2021

(65) Prior Publication Data

US 2021/0297964 A1    Sep. 23, 2021

Related U.S. Application Data

(60) Provisional application No. 62/993,512, filed on Mar. 23, 2020.

(51) Int. Cl.
*H04W 56/00* (2009.01)
*H04W 76/10* (2018.01)

(52) U.S. Cl.
CPC ......... *H04W 56/001* (2013.01); *H04W 76/10* (2018.02)

(58) Field of Classification Search
None
See application file for complete search history.

(56) References Cited

U.S. PATENT DOCUMENTS

| 10,244,522 | B2 | 3/2019 | Li et al. |
| 10,530,627 | B2 * | 1/2020 | Lee ..................... H04W 56/002 |

(Continued)

FOREIGN PATENT DOCUMENTS

| CN | 109891981 A | 6/2019 |
| CN | 110311762 A | 10/2019 |

(Continued)

OTHER PUBLICATIONS

Fujitsu: "Discussion on Mode 1 Resource Allocation for NR V2X", 3GPP Draft, R1-1908219, 3GPP TSG RAN WG1 #98, Discussion on Mode 1 Resource Allocation for NR V2X, 3rd Generation Partnership Project (3GPP), Mobile Competence Centre, 650, Route Des Lucioles, F-06921 Sophia-Antipolis Ced, vol. RAN WG1. No. Prague. CZ, Aug. 26, 2019-Aug. 30, 2019, Aug. 16, 2019 (Aug. 16, 2019), XP051764838, pp. 1-10, Retrieved from the Internet: URL:http://www.3gpp.org/ftp/tsg_ran/WG1_RL1/TSGR1_98/Docs/R1-1908219.zip [retrieved on Aug. 16, 2019] Section 2.1, Section 2.2 p. 2, Figure 1 p. 4, figures 2. 3.

(Continued)

*Primary Examiner* — Kenny S Lin
*Assistant Examiner* — Rodrick Mak
(74) *Attorney, Agent, or Firm* — Harrity & Harrity, LLP

(57) ABSTRACT

Various aspects of the present disclosure generally relate to wireless communication. In some aspects, a first user equipment (UE) may apply a timing adjustment for a sidelink connection with a second UE, wherein the timing adjustment causes a slot structure on the sidelink connection to align with a slot structure on an uplink connection with a base station; and transmit sidelink feedback, received via the sidelink connection, on the uplink connection based at least in part on the timing adjustment, wherein the sidelink feedback is mapped to a slot on the uplink connection, of two or more slots on the uplink connection that the sidelink feedback overlaps, based at least in part on a rule. Numerous other aspects are provided.

30 Claims, 21 Drawing Sheets

(56) References Cited

U.S. PATENT DOCUMENTS

| | | |
|---|---|---|
| 11,510,236 B2 | 11/2022 | Li et al. |
| 2018/0092064 A1 | 3/2018 | Ryu et al. |
| 2020/0029318 A1 | 1/2020 | Guo |
| 2020/0100223 A1 | 3/2020 | Park et al. |
| 2020/0403737 A1 | 12/2020 | Yeo et al. |
| 2021/0045100 A1 | 2/2021 | Park |
| 2021/0050953 A1 | 2/2021 | Park |
| 2021/0258891 A1 | 8/2021 | Papasakellariou et al. |
| 2021/0297971 A1 | 9/2021 | Hosseini |
| 2021/0377989 A1* | 12/2021 | Chae .................. H04W 72/23 |
| 2022/0095279 A1* | 3/2022 | Hwang ............... H04L 1/1822 |
| 2022/0174720 A1 | 6/2022 | Yang et al. |
| 2022/0183002 A1* | 6/2022 | Yeo .................... H04L 1/1607 |
| 2022/0201637 A1* | 6/2022 | Liu ......................... H04L 1/18 |
| 2022/0232565 A1 | 7/2022 | Shimezawa |
| 2022/0240209 A1* | 7/2022 | Zhao .................. H04W 56/001 |
| 2022/0255680 A1 | 8/2022 | Moon et al. |
| 2022/0294553 A1 | 9/2022 | Shibaike et al. |
| 2022/0353849 A1* | 11/2022 | Liu .................. H04W 72/0453 |
| 2022/0369342 A1 | 11/2022 | Nhan et al. |
| 2022/0369381 A1 | 11/2022 | Park et al. |
| 2023/0246742 A1 | 8/2023 | Yoshioka et al. |

FOREIGN PATENT DOCUMENTS

| | | |
|---|---|---|
| WO | 2018160372 | 9/2018 |
| WO | 2020017939 A1 | 1/2020 |

OTHER PUBLICATIONS

Huawei, et al., "NR DCI and UCI Design for Resource Allocation Mode 1", 3GPP Draft, R1-1909315, 3GPP TSG RAN WG1 Meeting #98, 3rd Generation Partnership Project (3GPP), Mobile Competence Centre, 650, Route Des Lucioles, F-06921 Sophia-Antipolis Cedex, France, vol. RAN WG1. No. Prague, Czech Republic, Aug. 26, 2019-Aug. 30, 2019, Aug. 17, 2019 (Aug. 17, 2019), XP051765922, 7 Pages, Retrieved from the Internet: URL:http://www.3gpp.org/ftp/tsg_ran/WG1_RL1/TSGR1_98/Docs/R1-1909315.zip [retrieved on Aug. 17, 2019] Section 2.2, p. 3, Figure 1 p. 5, Figure 2.

International Search Report and Written Opinion—PCT/US2021/023707—ISA/EPO—Jun. 28, 2021.

NTT Docomo, Inc: "Sidelink Resource Allocation Mechanism Mode 1 for NR V2X", 3GPP Draft, R1-1912881, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1. No. Reno. US, Nov. 18, 2019-Nov. 22, 2019, Nov. 9, 2019 (Nov. 9, 2019), XP051823661, Pp. 1-15, Retrieved from the Internet: URL:https://ftp.3gpp.org/tsg_ran/WG1_RL1/TSGR1_99/Docs/R1-1912881.zip R1-1912881_DCM_SL_RA mode 1_fin.docx [retrieved—on Nov. 9, 2019] p. 3-5, Section 2.2, p. 4, figure 1 p. 5, figure 2, Page, p. 7, figure 3.

* cited by examiner

SIDELINK FEEDBACK REPORTING

CROSS-REFERENCE TO RELATED APPLICATION

This Patent Application claims priority to U.S. Provisional Patent Application No. 62/993,512, filed on Mar. 23, 2020, entitled "SIDELINK FEEDBACK REPORTING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sidelink feedback reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a first user equipment (UE), may include receiving sidelink feedback on a sidelink connection with a second UE; and providing the sidelink feedback on an uplink resource via an uplink connection with a base station, wherein the uplink resource is separated, in time, from a sidelink resource on which the sidelink feedback is received by at least a minimum processing time, wherein the minimum processing time is based at least in part on respective parameters associated with the sidelink connection and the uplink connection.

In some aspects, a method of wireless communication, performed by a base station, may include configuring, for a first UE, a sidelink resource for sidelink feedback on a sidelink connection between the first UE and a second UE; configuring, for the first UE, an uplink resource for the sidelink feedback on an uplink connection between the base station and the first UE, wherein the uplink resource is separated, in time, from the sidelink resource by at least a minimum processing time, wherein the minimum processing time is based at least in part on respective parameters associated with the sidelink connection and the uplink connection; and receiving the sidelink feedback on the uplink resource.

In some aspects, a method of wireless communication, performed by a first UE, may include applying a timing adjustment for a sidelink connection with a second UE, wherein the timing adjustment causes a slot structure on the sidelink connection to align with a slot structure on an uplink connection with a base station; and transmitting sidelink feedback, received via the sidelink connection based at least in part on the timing adjustment, on the uplink connection, wherein the sidelink feedback is mapped to a slot on the uplink connection, of two or more slots that the sidelink feedback overlaps, based at least in part on a rule.

In some aspects, a method of wireless communication, performed by a base station, may include identifying a timing adjustment for a sidelink connection between a first UE and a second UE, wherein the timing adjustment causes a slot structure on the sidelink connection to align with a slot structure on an uplink connection between the base station and the first UE; and receiving sidelink feedback from the first UE on the uplink connection based at least in part on the timing adjustment, wherein the sidelink feedback is mapped to a slot on the uplink connection, of two or more slots that the sidelink feedback overlaps, based at least in part on a rule.

In some aspects, a first UE for wireless communication may include a memory and one or more processors operatively coupled to the memory. The memory and the one or more processors may be configured to receive sidelink feedback on a sidelink connection with a second UE; and provide the sidelink feedback on an uplink resource via an uplink connection with a base station, wherein the uplink resource is separated, in time, from a sidelink resource on which the sidelink feedback is received by at least a minimum processing time, wherein the minimum processing time is based at least in part on respective parameters associated with the sidelink connection and the uplink connection.

In some aspects, a base station for wireless communication may include a memory and one or more processors operatively coupled to the memory. The memory and the one or more processors may be configured to configure, for a first UE, a sidelink resource for sidelink feedback on a sidelink connection between the first UE and a second UE; configure, for the first UE, an uplink resource for the sidelink feedback on an uplink connection between the base station and the first UE, wherein the uplink resource is separated, in time, from the sidelink resource by at least a minimum processing time, wherein the minimum processing time is based at least in part on respective parameters associated with the sidelink connection and the uplink connection; and receive the sidelink feedback on the uplink resource.

In some aspects, a first UE for wireless communication may include a memory and one or more processors operatively coupled to the memory. The memory and the one or more processors may be configured to apply a timing adjustment for a sidelink connection with a second UE, wherein the timing adjustment causes a slot structure on the sidelink connection to align with a slot structure on an uplink connection with a base station; and transmit sidelink feedback, received via the sidelink connection based at least in part on the timing adjustment, on the uplink connection, wherein the sidelink feedback is mapped to a slot on the uplink connection, of two or more slots that the sidelink feedback overlaps, based at least in part on a rule.

In some aspects, a base station for wireless communication may include a memory and one or more processors operatively coupled to the memory. The memory and the one or more processors may be configured to identify a timing adjustment for a sidelink connection between a first UE and a second UE, wherein the timing adjustment causes a slot structure on the sidelink connection to align with a slot structure on an uplink connection between the base station and the first UE; and receive sidelink feedback from the first UE on the uplink connection based at least in part on the timing adjustment, wherein the sidelink feedback is mapped to a slot on the uplink connection, of two or more slots that the sidelink feedback overlaps, based at least in part on a rule.

In some aspects, a non-transitory computer-readable medium may store one or more instructions for wireless communication. The one or more instructions, when executed by one or more processors of a first UE, may cause the one or more processors to receive sidelink feedback on a sidelink connection with a second UE; and provide the sidelink feedback on an uplink resource via an uplink connection with a base station, wherein the uplink resource is separated, in time, from a sidelink resource on which the sidelink feedback is received by at least a minimum processing time, wherein the minimum processing time is based at least in part on respective parameters associated with the sidelink connection and the uplink connection.

In some aspects, a non-transitory computer-readable medium may store one or more instructions for wireless communication. The one or more instructions, when executed by one or more processors of a base station, may cause the one or more processors to configure, for a first UE, a sidelink resource for sidelink feedback on a sidelink connection between the first UE and a second UE; configure, for the first UE, an uplink resource for the sidelink feedback on an uplink connection between the base station and the first UE, wherein the uplink resource is separated, in time, from the sidelink resource by at least a minimum processing time, wherein the minimum processing time is based at least in part on respective parameters associated with the sidelink connection and the uplink connection; and receive the sidelink feedback on the uplink resource.

In some aspects, a non-transitory computer-readable medium may store one or more instructions for wireless communication. The one or more instructions, when executed by one or more processors of a first UE, may cause the one or more processors to apply a timing adjustment for a sidelink connection with a second UE, wherein the timing adjustment causes a slot structure on the sidelink connection to align with a slot structure on an uplink connection with a base station; and transmit sidelink feedback, received via the sidelink connection, on the uplink connection based at least in part on the timing adjustment, wherein the sidelink feedback is mapped to a slot on the uplink connection, of two or more slots that the sidelink feedback overlaps, based at least in part on a rule.

In some aspects, a non-transitory computer-readable medium may store one or more instructions for wireless communication. The one or more instructions, when executed by one or more processors of a base station, may cause the one or more processors to identify a timing adjustment for a sidelink connection between a first UE and a second UE, wherein the timing adjustment causes a slot structure on the sidelink connection to align with a slot structure on an uplink connection between the base station and the first UE; and receive sidelink feedback from the first UE on the uplink connection based at least in part on the timing adjustment, wherein the sidelink feedback is mapped to a slot on the uplink connection, of two or more slots that the sidelink feedback overlaps, based at least in part on a rule.

In some aspects, an apparatus for wireless communication may include means for receiving sidelink feedback on a sidelink connection with a UE; and means for providing the sidelink feedback on an uplink resource via an uplink connection with a base station, wherein the uplink resource is separated, in time, from a sidelink resource on which the sidelink feedback is received by at least a minimum processing time, wherein the minimum processing time is based at least in part on respective parameters associated with the sidelink connection and the uplink connection.

In some aspects, an apparatus for wireless communication may include means for configuring, for a first UE, a sidelink resource for sidelink feedback on a sidelink connection between the first UE and a second UE; means for configuring, for the first UE, an uplink resource for the sidelink feedback on an uplink connection between the apparatus and the first UE, wherein the uplink resource is separated, in time, from the sidelink resource by at least a minimum processing time, wherein the minimum processing time is based at least in part on respective parameters associated with the sidelink connection and the uplink connection; and means for receiving the sidelink feedback on the uplink resource.

In some aspects, an apparatus for wireless communication may include means for applying a timing adjustment for a sidelink connection with a UE, wherein the timing adjustment causes a slot structure on the sidelink connection to align with a slot structure on an uplink connection with a base station; and means for transmitting sidelink feedback, received via the sidelink connection, on the uplink connection based at least in part on the timing adjustment, wherein the sidelink feedback is mapped to a slot on the uplink connection, of two or more slots that the sidelink feedback overlaps, based at least in part on a rule.

In some aspects, an apparatus for wireless communication may include means for identifying a timing adjustment for a sidelink connection between a first UE and a second UE, wherein the timing adjustment causes a slot structure on the sidelink connection to align with a slot structure on an uplink connection between the apparatus and the first UE; and means for receiving sidelink feedback from the first UE on the uplink connection based at least in part on the timing adjustment, wherein the sidelink feedback is mapped to a slot on the uplink connection, of two or more slots that the sidelink feedback overlaps, based at least in part on a rule.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
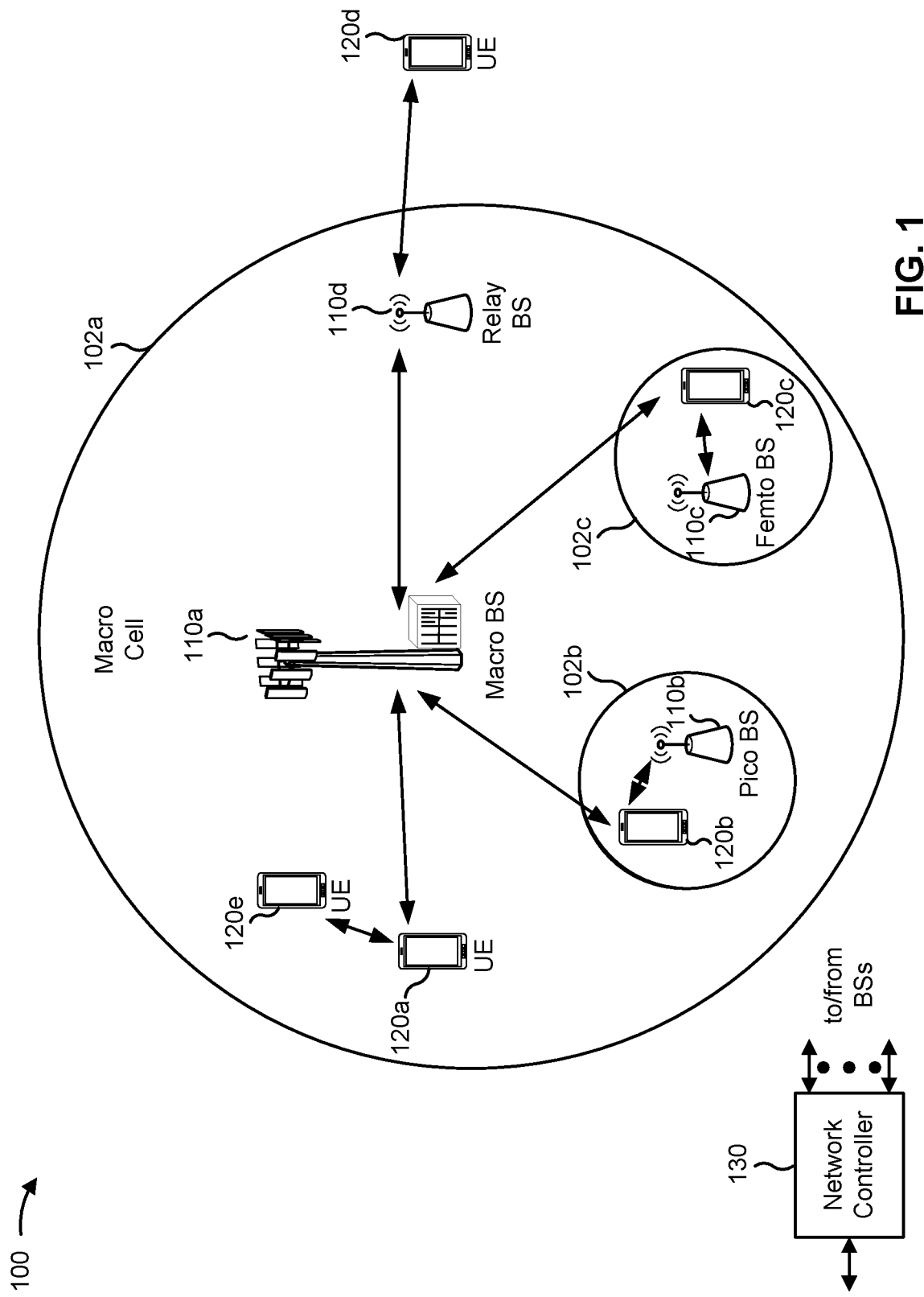
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, a first UE 120 (e.g., UE 120*a*) may provide a relay service for a second UE (e.g., UE 120*e*) via a sidelink. For example, sidelink communication can occur between a remote UE 120 (e.g., UE 120*e*) and a relay UE 120 (e.g., UE 120*a*) for data transmission to or from the BS 110. In some aspects, the remote UE 120 may be out of the coverage area of the radio access network so that the remote UE 120 cannot communicate directly with the BS 110. In such a case, relays can be deployed to extend network coverage. Techniques and apparatuses described herein provide synchronization of sidelink and uplink communications by a relay UE 120, as well as determination of a minimum processing time for the relay UE 120 based at least in part on parameters associated with the sidelink and the uplink.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
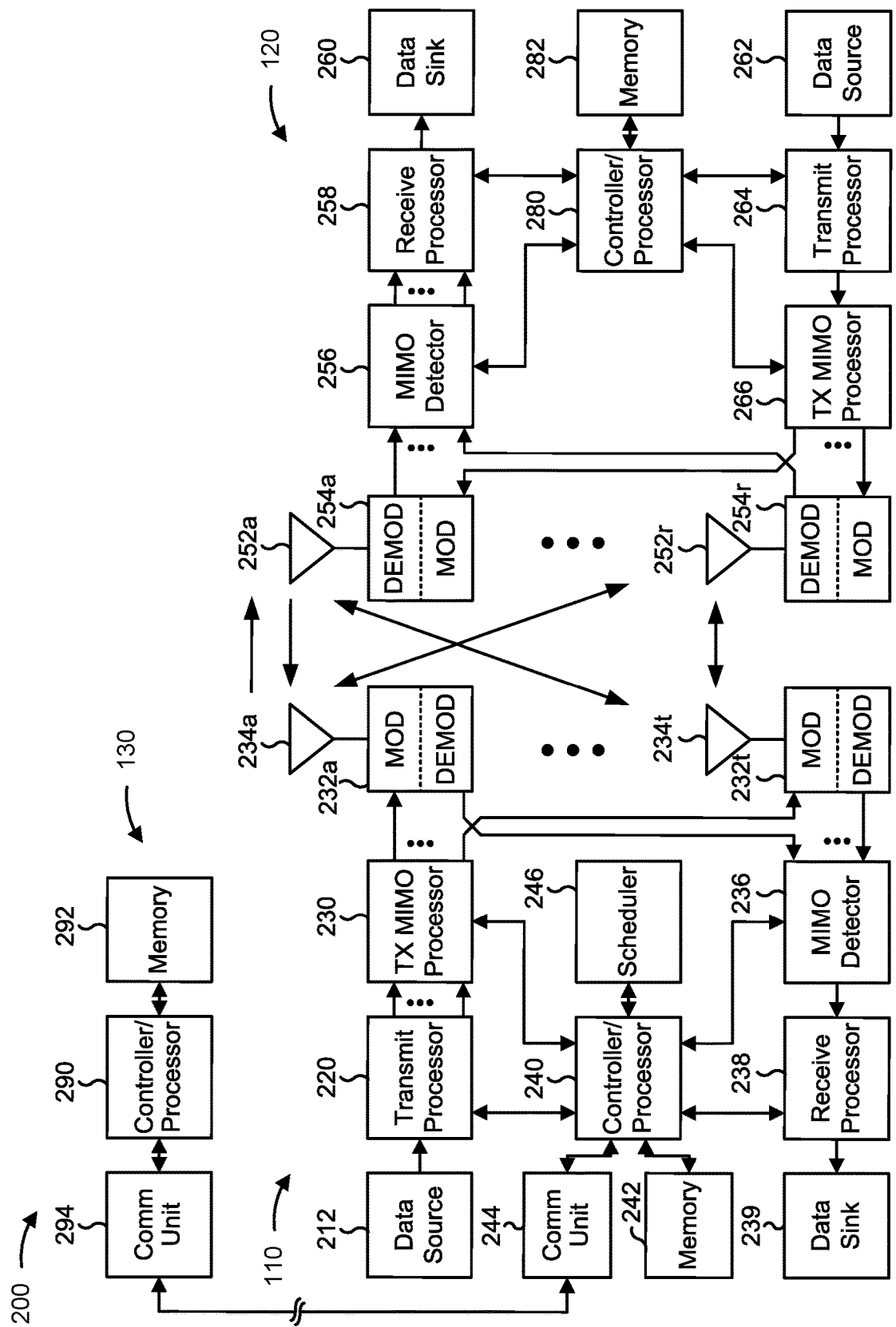
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-21.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-21.

Controller/processor 240 of base station 110, controller/processor 280 of UE 120, and/or any other component(s) of FIG. 2 may perform one or more techniques associated with sidelink feedback reporting, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
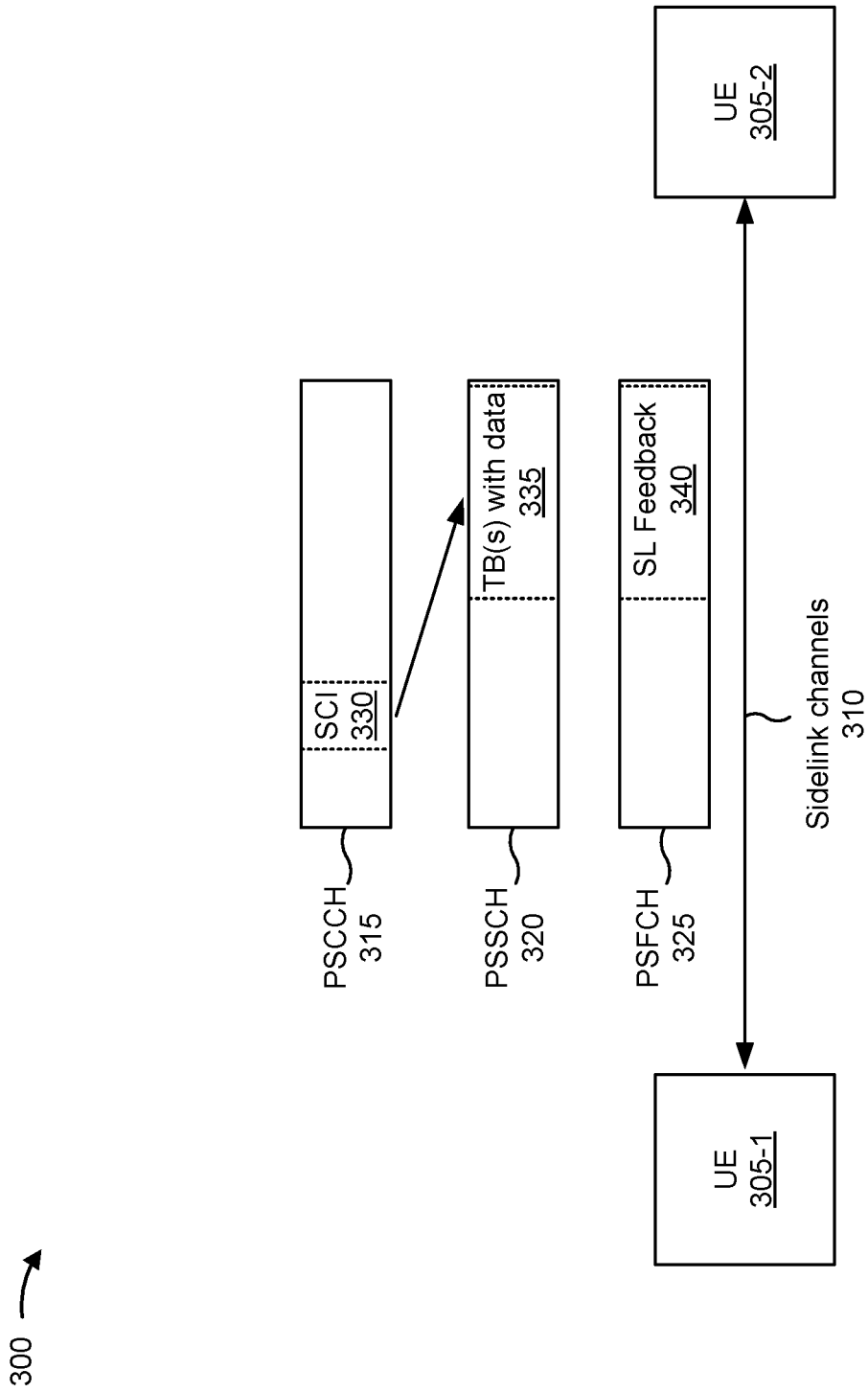
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs. Sidelink communications may take place using resource pools. Resource pools may be defined for transmission and reception. A resource pool may comprise sub-channels in frequency and slots in time. For example, the minimum resource allocation in frequency may be a sub-channel, and the minimum resource allocation in time may be a slot. Certain slots may be unavailable for sidelink communications.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
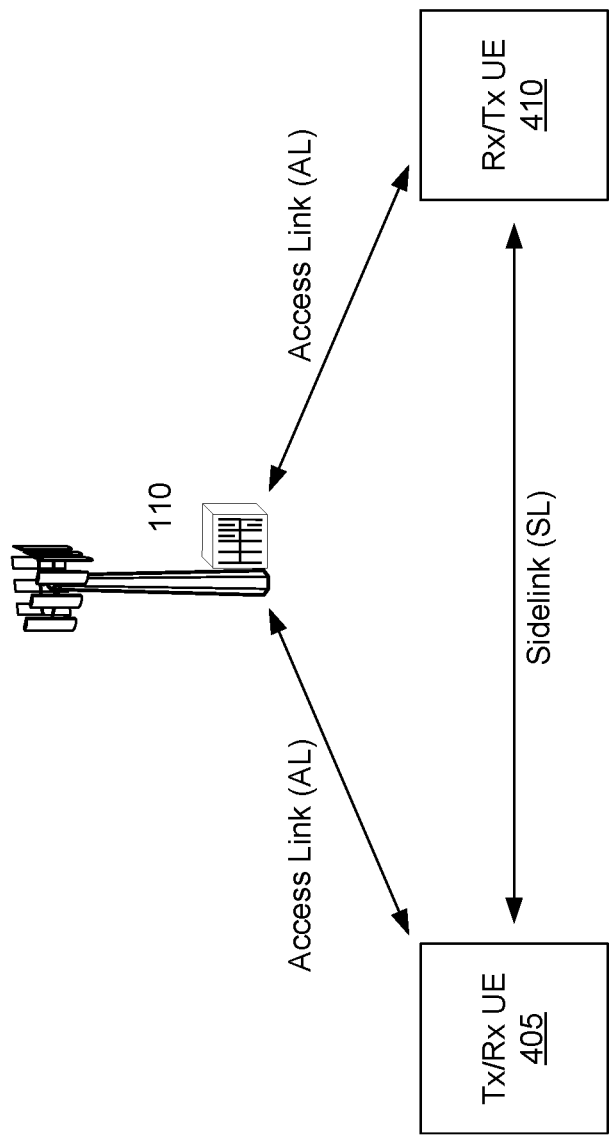
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a UE 405 and a UE 410 may communicate with one another via a sidelink, as described above in connection with FIG. 3. As shown, the UE 405 may be a transmitting (Tx) UE or a receiving (Rx) UE, and the UE 410 may be a Tx UE or an Rx UE. In example 400, the UE 405 is a Tx UE and the UE 410 is an Rx UE. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, "sidelink" may refer to a direct link between UEs 120, and "access link" may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
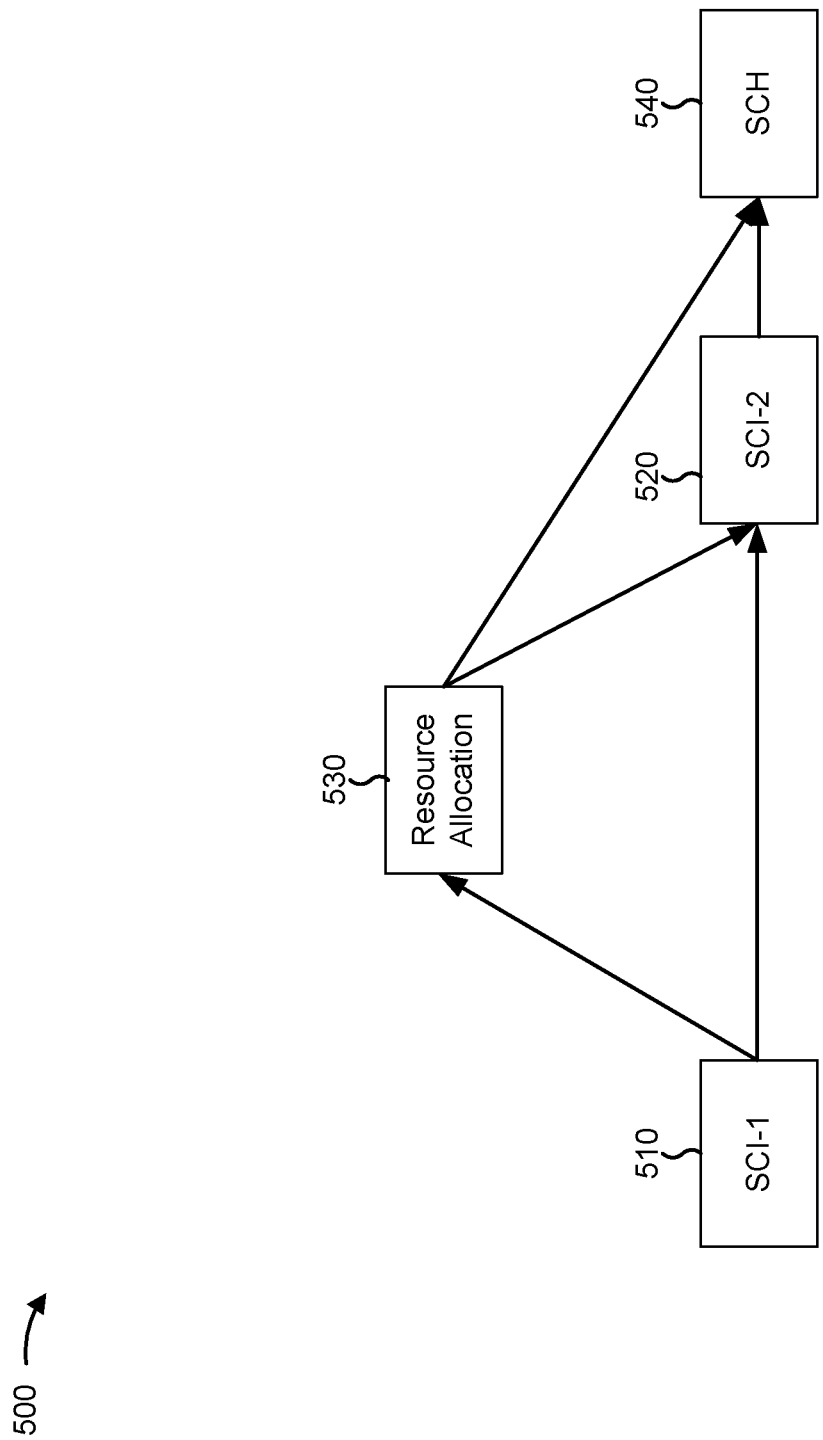
FIG. 5 is a diagram illustrating an example of two-stage sidelink control information, in accordance with the present disclosure.

FIG. 5 is a diagram illustrating an example 500 of two-stage sidelink control information (SCI), in accordance with the present disclosure. SCI may be provided in a first stage and a second stage, shown by reference numbers 510 and 520. The first stage may be referred to as SCI-1 and the second stage may be referred to as SCI-2. SCI-1 may be transmitted on a PSCCH. SCI-1 may include a resource allocation shown by reference number 530, and may include information for decoding SCI-2 (e.g., a format of SCI-2 and/or other information). The resource allocation may indicate resources for SCI-2 and/or a shared channel (SCH) shown by reference number 540. SCI-2 may be transmitted on a PSSCH. SCI-2 may include information for decoding the SCH. SCI-1 and/or SCI-2 may be encoded and/or decoded using a physical downlink control channel (PDCCH) polar coding/decoding chain.

In some aspects, SCI-2 may be mapped to contiguous resource blocks (RBs) in the PSSCH, starting from a first symbol with a PSSCH demodulation reference signal (DMRS). In some aspects, SCI-2 may be scrambled separately from the SCH. In some aspects, SCI-2 may be modulated using quadrature phase shift keying (QPSK). Since the format of SCI-2 may be indicated by SCI-1, a recipient of SCI-2 may not perform blind decoding of SCI-2, thereby conserving computing resources.

As indicated above, FIG. 5 is provided as an example. Other examples may differ from what is described with regard to FIG. 5.

Figure 6:
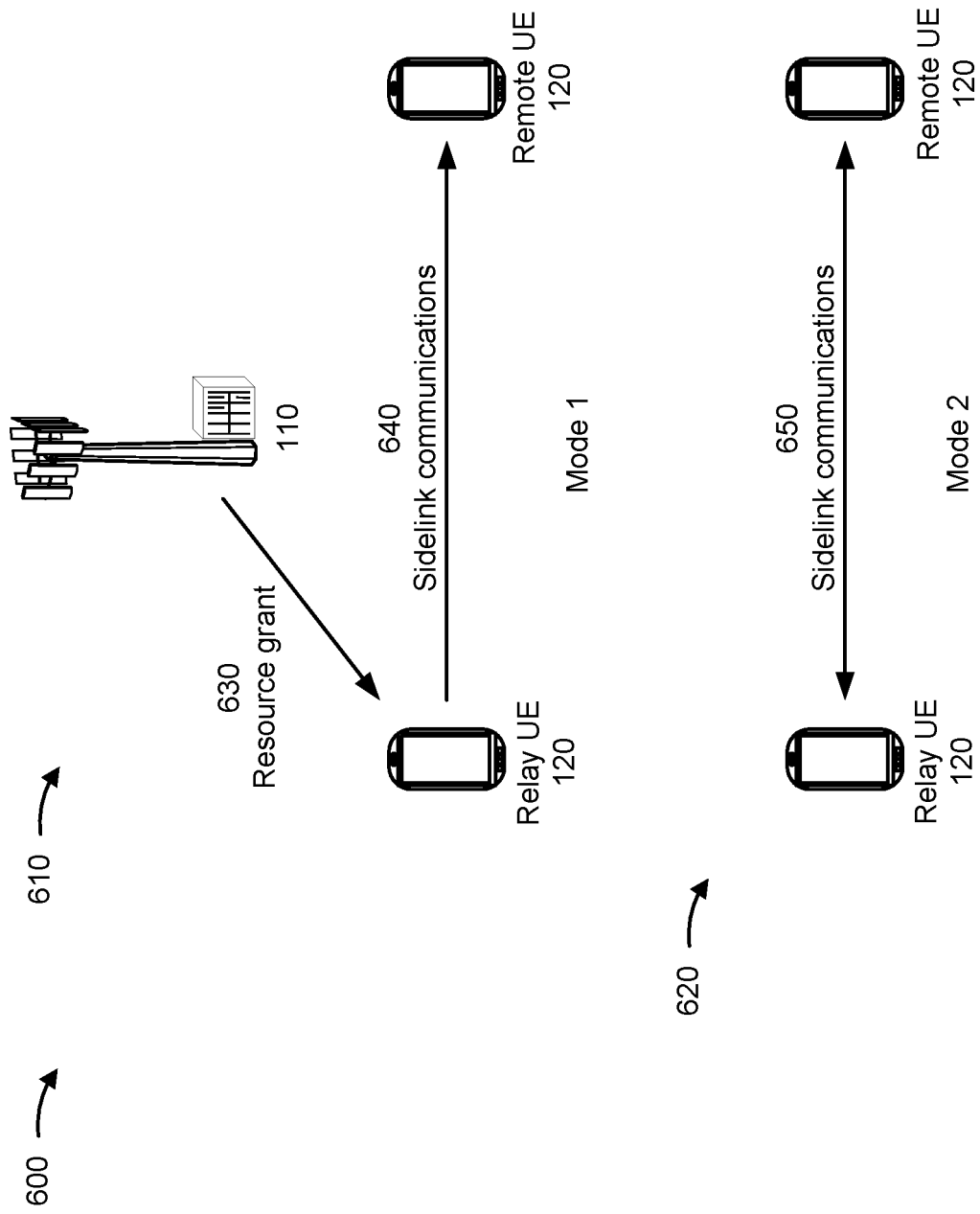
FIG. 6 is a diagram illustrating an example of sidelink resource allocation modes, in accordance with the present disclosure.

FIG. 6 is a diagram illustrating an example 600 of sidelink resource allocation modes, in accordance with the present disclosure. As shown, example 600 includes a BS 110 and two UEs 120 (e.g., UE 305, UE 405, and/or the like). A first mode, shown by reference number 610, may be referred to as Mode 1, and may include dynamic grant modes and configured grant modes. A second mode, shown by reference number 620, may be referred to as Mode 2.

In the first mode, the BS 110 may provide a resource grant 630 to a relay UE 120, and the relay UE 120 may perform sidelink communications 640 with the remote UE 120 using the resource grant 630. In some aspects, the resource grant 630 is a dynamic grant. In this case, the resource grant 630 may comprise a dynamic resource allocation via a SL-RNTI on a PDCCH to the relay UE 120, followed by a PSCCH/PSSCH sidelink communication 640 on a PC5 interface. The remote UE 120 may monitor the PSCCH. In some aspects, the resource grant 630 may comprise a configured grant. In a first type of configured grant (e.g., type 1), radio resource control (RRC) signaling may directly provide the configured sidelink grant only for NR sidelink communication. The remote UE 120 may monitor the PSCCH. In a second type of configured grant, RRC signaling may define a configured sidelink grant. A PDCCH on the Uu interface between the relay UE 120 and the BS 110 may signal and activate the configured sidelink grant, or may deactivate the configured sidelink grant. The remote UE 102 may monitor the PSCCH.

In the second mode, one or more resource pools may be pre-configured for sidelink communications 650 between the relay UE 120 and the remote UE 120. The relay UE 120 and the remote UE 120 may utilize the one or more resource pools using sensing and resource reservation techniques to perform the sidelink communications 650. The second mode may involve less communication with a central entity, such as a BS 110, than the first mode, whereas the first mode may involve less overhead associated with sensing and resource reservation techniques.

As indicated above, FIG. 6 is provided as one or more examples. Other examples may differ from what is described with regard to FIG. 6.

A remote UE may utilize the services of a relay UE to relay communications between the remote UE and a BS. In a first mode of resource allocation for relay UEs and remote UEs, referred to herein as Mode 1, a BS may provide a grant indicating a resource allocation for communication between the remote UE and the relay UE. In the first mode, the remote UE may provide hybrid automatic repeat request (HARQ) feedback, such as HARQ acknowledgments (ACKs), HARQ codebooks, or the like, to the relay UE regarding a transmission by the relay UE to the remote UE. For example, the transmission by the relay UE may be scheduled by the BS, and may include a PSCCH, a PSSCH, and/or the like. The relay UE may relay the HARQ feedback to the BS. The BS may provide an indication, in downlink control information (DCI) associated with the grant, of which PUCCH resource and which slot should be used by the relay UE to provide the HARQ feedback to the BS. The relay UE may receive the HARQ feedback from the remote UE on a PSFCH, and may provide the HARQ feedback to the BS on the PUCCH resource and slot indicated by the BS.

In some cases, a UE may be associated with a processing limitation that may affect how quickly the UE can perform a transmission or action after receiving a communication. A minimum processing time may be used to ensure that a time between receiving the communication and performing the transmission or action is not shorter than a processing time capability of the UE. A UE may be associated with a minimum processing time capability which, in some implementations, may be selected from a slower or baseline minimum processing time capability and a faster minimum processing time capability. A BS may configure a carrier or bandwidth part to support UEs with a certain minimum processing time capability. The minimum processing time of a UE may be determined by reference to a subcarrier spacing of a carrier or bandwidth part associated with the UE and a minimum processing time capability of the UE. For example, the minimum processing time may be defined in terms of symbols. "Minimum processing time" is used interchangeably with "minimum processing timeline" herein.

In the case of a relay UE forwarding a sidelink HARQ-ACK, the relay UE may be associated with certain processing timeline constraints. For example, the relay UE may be unable to relay the sidelink HARQ-ACK if an end of the PSFCH is too close, in time, to a start of the PUCCH. However, an uplink connection (e.g., carrier, bandwidth part, and/or the like) on which the PUCCH is transmitted may be associated with different parameters than a sidelink connection, carrier, bandwidth part, or the like, on which the PSFCH is received. For example, a sidelink connection and an uplink connection may have different subcarrier spacings and/or may be configured to support different minimum processing times. Therefore, there may be ambiguity as to how to determine a minimum processing time for the relay UE. For example, a mismatch between subcarrier spacings and minimum processing times may lead to determination of a minimum processing time that is too aggressive for a relay UE (which may lead to dropped PUCCHs and wasted UE resources) or too conservative for a relay UE (which may lead to suboptimal resource allocation).

Furthermore, in some cases, a sidelink carrier may not be synchronized with a downlink carrier between the relay UE and the base station. For example, the sidelink carrier may be synchronized to a different source than the base station. In this case, the base station may not know whether the sidelink carrier is leading the downlink carrier or lagging the downlink carrier, so the base station may not be able to guarantee the minimum processing time of the relay UE. Still further, in some cases, a PSFCH resource may overlap two or more uplink slots due to the timing difference between the sidelink connection and the uplink connection, even if subcarrier spacings are shared between the sidelink connection and the uplink connection. In this case, it may be unclear how the PSFCH resource is to be mapped to the uplink connection, which may lead to wasted resources, retransmissions of the HARQ feedback, and/or the like.

Some techniques and apparatuses described herein provide determination of a minimum processing time for a relay UE based at least in part on respective parameters of a sidelink connection (e.g., carrier, bandwidth part) and an uplink connection (e.g., carrier, bandwidth part) of the relay UE. For example, the minimum processing time may identify a minimum length of time between a PSFCH on the sidelink connection and a PUCCH on the uplink connection. More particularly, the minimum processing time may identify a number of symbols between a last symbol of the PSFCH and a first symbol of the PUCCH. Some techniques and apparatuses described herein may determine the minimum processing time based at least in part on subcarrier spacings of the sidelink connection and/or the uplink connection, minimum processing times associated with the sidelink connection and/or the uplink connection, minimum processing time capabilities associated with the sidelink connection and/or the uplink connection, and/or the like.

Furthermore, some techniques and apparatuses described herein provide for determination and application of a timing adjustment for a sidelink connection. The timing adjustment may cause a slot structure on the sidelink connection to align with a slot structure on an uplink connection, thereby improving likelihood that the minimum processing time is satisfied. Some techniques and apparatuses described herein provide mapping of sidelink feedback to a selected slot on the uplink based at least in part on a rule, which reduces ambiguity with sidelink feedback mapping and improves likelihood that minimum processing timelines are satisfied.

Figure 7:
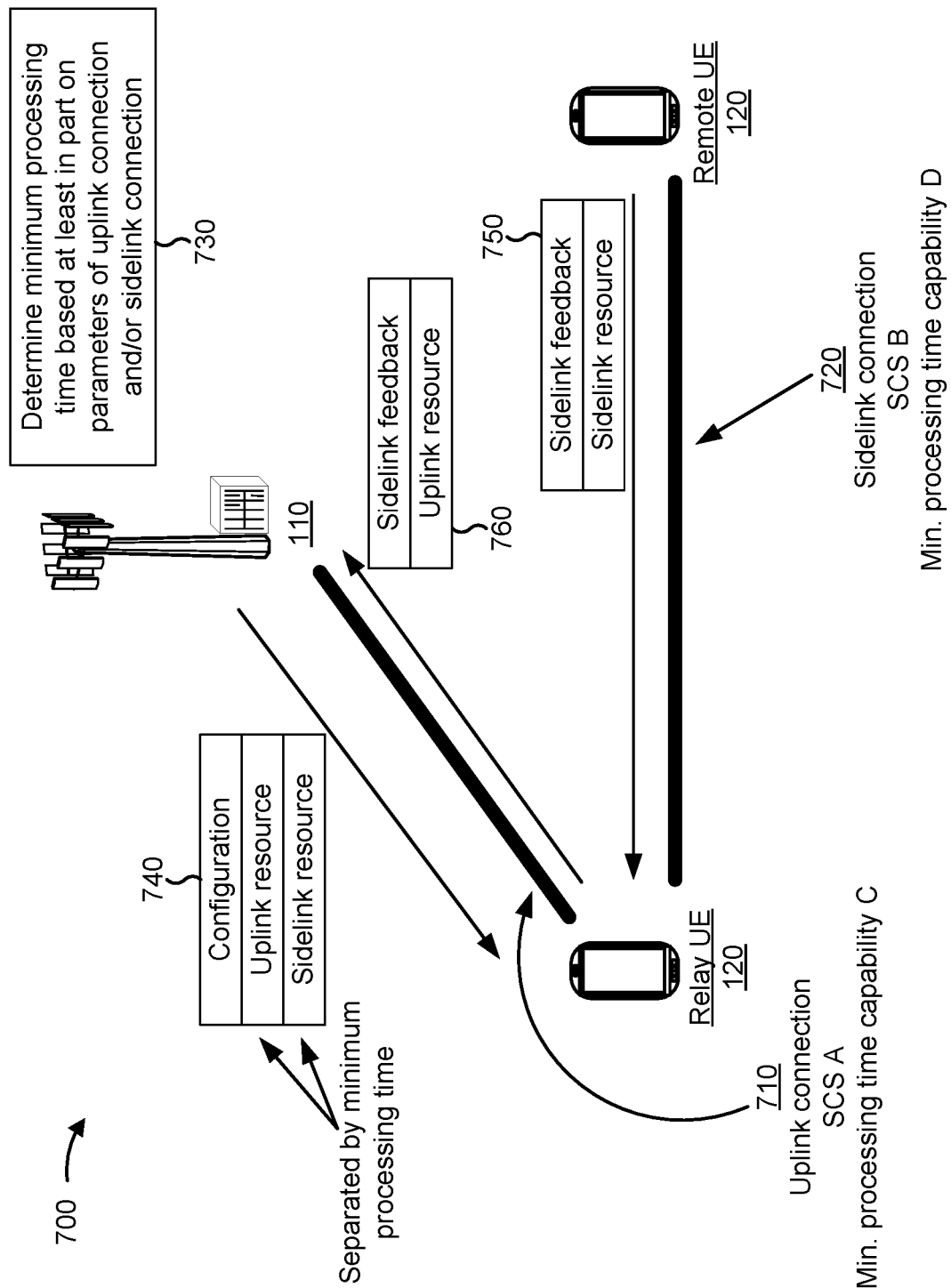
FIG. 7 is a diagram illustrating an example of determination of a minimum processing time for sidelink feedback on an uplink connection, in accordance with the present disclosure.

FIG. 7 is a diagram illustrating an example 700 of determination of a minimum processing time for sidelink feedback on an uplink connection, in accordance with the present disclosure. As shown, example 700 includes a BS 110, a remote UE 120 (e.g., UE 305, UE 405), and a relay UE 120 (e.g., UE 305, UE 405). As shown by reference number 710, the relay UE 120 is associated with an uplink connection to the BS 110. This uplink connection may be a radio access link, such as a Uu link and/or the like. As further shown, the uplink connection is associated with a subcarrier spacing (SCS) value of A and a minimum processing time capability of C. For example, a carrier or bandwidth part associated with the uplink connection may be associated with the SCS value of A and the minimum processing time capability of C. As shown by reference number 720, the relay UE 120 is also associated with a sidelink connection to the remote UE 120. For example, the sidelink connection may be a PC5 link and/or the like. As further shown, the sidelink connection is associated with an SCS value of B and a minimum processing time capability of D. B may or may not be different than A, and C may or may not be different than D.

As shown by reference number 730, the BS 110 may determine (e.g., using controller/processor 240 and/or the like) a minimum processing time for the relay UE 120. The minimum processing time may identify a minimum length of time (e.g., a minimum number of symbols) between a last symbol of a sidelink resource and a first symbol of an uplink resource. If the minimum processing time is satisfied for sidelink feedback that is received by the relay UE 120 on the sidelink resource and to be transmitted by the relay UE 120 on the uplink resource, then the sidelink feedback is considered valid by the UE 120. If the minimum processing time is not satisfied for the sidelink feedback, then the sidelink feedback may not be considered valid by the UE 120. In some aspects, the relay UE 120 may delay PUCCH transmission until the first available PUCCH resource/occasion that satisfies the minimum processing time.

A minimum processing time for a connection (e.g., a carrier, a bandwidth part) may be determined based at least in part on an SCS and a minimum processing time capability associated with the connection. For example, the BS 110 may configure the connection to support a minimum processing time capability and to use an SCS. The BS 110 may refer to a table that corresponds to the minimum processing time capability to determine the minimum processing time. For example, the table may identify SCSs and corresponding minimum processing times for the minimum processing time capability. The table may be defined by a wireless communication standard, such as a 3GPP 5G/NR specification. Here, however, the relay UE 120 is associated with two connections (a sidelink connection and an uplink connection) that are each associated with respective SCSs and minimum processing time capabilities. Techniques for determining a minimum processing time for the relay UE 120 are described below.

In some aspects, the BS 110 may determine the minimum processing time based at least in part on the SCS and/or the minimum processing time capability of the uplink connection. For example, the BS 110 may use the SCS A and/or the minimum processing time capability C to determine the minimum processing time of the relay UE 120. In some aspects, the BS 110 may determine the minimum processing time based at least in part on the SCS and/or the minimum processing time capability of the sidelink connection. For example, the BS 110 may use the SCS B and/or the minimum processing time capability D to determine the minimum processing time of the relay UE 120.

In some aspects, the BS 110 may select an SCS from the SCSs associated with the sidelink carrier and the uplink carrier. For example, the BS 110 may select a smallest SCS (corresponding to a largest symbol length) of the sidelink carrier and the uplink carrier. This may be considered a conservative approach, since the longer symbol length may be used. In some aspects, after selecting the SCS, the BS 110 may determine the minimum processing time based at least in part on a minimum processing time capability associated with the uplink connection. In some aspects, after selecting the SCS, the BS 110 may determine the minimum processing time based at least in part on a minimum processing time capability associated with the sidelink connection. In some aspects, the BS 110 may select a minimum processing time capability for determination of the minimum processing time in association with the selected SCS based at least in part on respective minimum processing time capabilities of the uplink connection and the sidelink connection. For example, if at least one connection, of the sidelink connection and the uplink connection, is associated with a slower minimum processing time capability (e.g., minimum processing time capability #1 in 3GPP Technical Specification 38.214), then the BS 110 may determine the minimum processing time based at least in part on the slower minimum processing time capability. If no connections, of the sidelink connection and the uplink connection, are associated with the slower minimum processing time capability, then the BS 110 may determine the minimum processing time based at least in part on a faster minimum processing time capability (e.g., minimum processing time capability #2 in 3GPP Technical Specification 38.214). In some aspects, the BS 110 may select a slowest minimum processing time capability regardless of the minimum processing time capabilities configured for the uplink and sidelink grants.

In some aspects, the BS 110 may determine the minimum processing time based at least in part on respective minimum processing times for the uplink connection and the sidelink connection. For example, the BS 110 may determine a first minimum processing time for the uplink connection based at least in part on SCS A and minimum processing time capability C, and may determine a second minimum processing time for the sidelink connection based at least in part on SCS B and minimum processing time capability D. The BS 110 may select a minimum processing time from the first minimum processing time and the second minimum processing time. For example, the BS 110 may select a higher minimum processing time, of the first minimum processing time and the second minimum processing time, as the selected minimum processing time, thereby ensuring that sufficient processing time is provided for the sidelink feedback. In some aspects, the BS 110 may select a lower minimum processing time, an average minimum processing time, a lowest minimum processing time that satisfies a threshold, and/or the like.

In some aspects, the minimum processing time may be fixed. For example, the minimum processing time may be pre-configured for the relay UE 120 (e.g., as part of a wireless communication standard, as part of a manufacturer configuration of the relay UE 120, as part of activation or onboarding of the relay UE 120, and/or the like).

As shown by reference number 740, the BS 110 may configure (e.g., using controller/processor 240, transmit processor 220, TX MIMO processor 230, MOD 232, antenna 234, and/or the like) an uplink resource and a sidelink resource for the sidelink feedback. For example, the BS 110 may configure a PSFCH resource on the sidelink connection, and may configure a PUCCH resource on the uplink connection. As further shown, the uplink resource and the sidelink resource are separated by at least the minimum processing time determined in connection with reference number 730. Thus, the sidelink feedback is configured with sufficient processing time that the relay UE 120 can successfully relay the sidelink feedback to the BS 110, despite the potentially different parameters associated with the sidelink connection and the uplink connection. As shown by reference number 750, the remote UE 120 (e.g., using controller/processor 280, transmit processor 264, TX MIMO processor 266, MOD 254, antenna 252, and/or the like) may provide the sidelink feedback on the sidelink resource. As shown by reference number 760, the relay UE 120 (e.g., using controller/processor 280, transmit processor 264, TX MIMO processor 266, MOD 254, antenna 252, and/or the like) may provide the sidelink feedback to the BS 110 on the uplink resource.

As indicated above, FIG. 7 is provided as an example. Other examples may differ from what is described with respect to FIG. 7.

Figure 8:
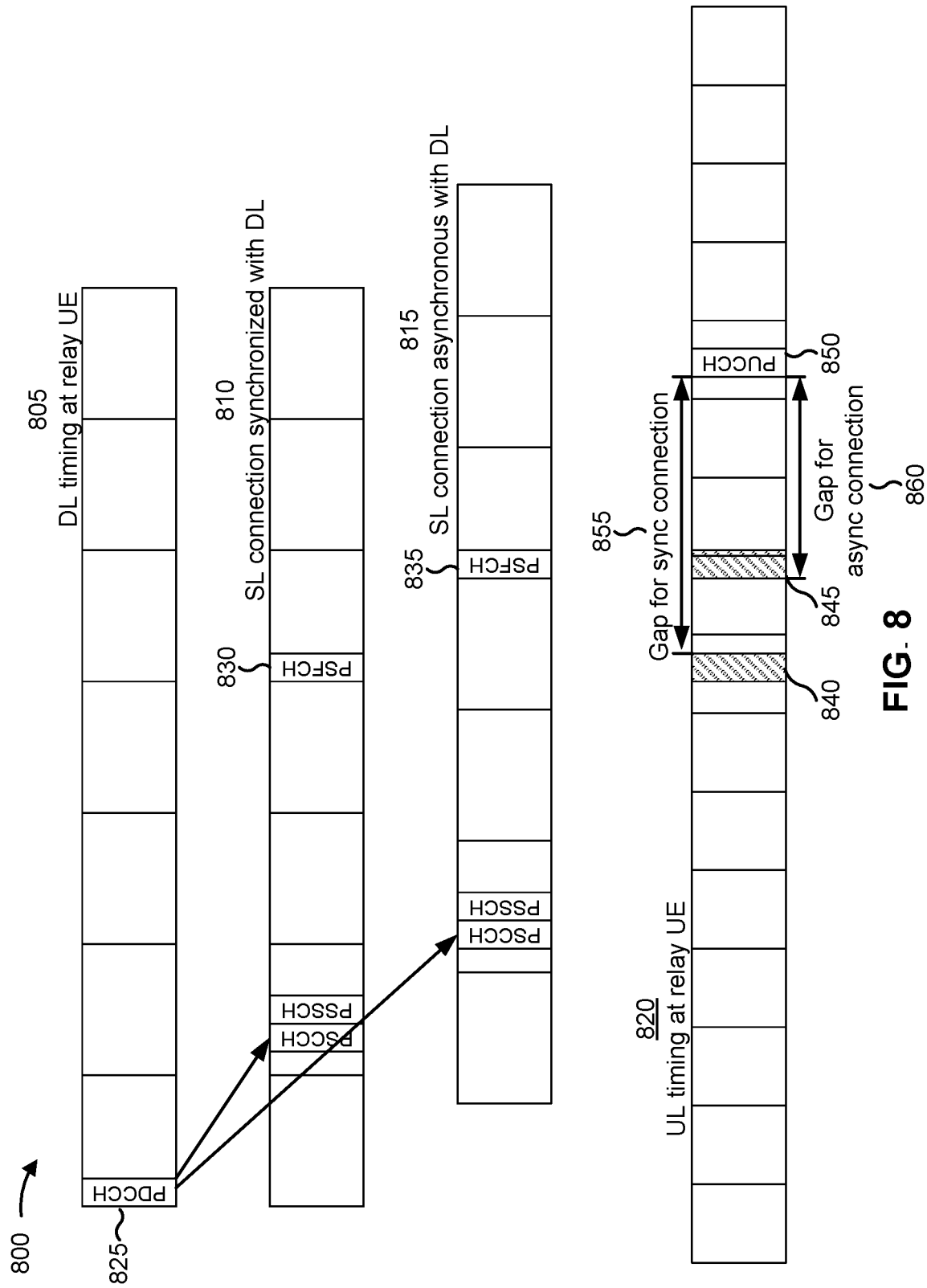
FIG. 8 is a diagram illustrating an example of alignment of a sidelink connection timing and an uplink connection timing, in accordance with the present disclosure.

FIG. 8 is a diagram illustrating an example 800 of alignment of a sidelink connection timing and an uplink connection timing, in accordance with the present disclosure. Example 800 shows a downlink connection 805's timing at a relay UE (e.g., UE 120, UE 305, UE 405), a sidelink connection 810's timing for a sidelink connection that is synchronized with the downlink connection timing, a sidelink connection timing for a sidelink connection 815 that is asynchronous with the downlink connection 805, and an uplink connection 820's timing at the relay UE. The operations shown in FIG. 8 may be performed by the relay UE. As shown, the sidelink connection 815 is asynchronous, and may be said to lag the downlink connection 805 since the sidelink connection 815 is associated with a later timing than the downlink connection 805.

As shown by reference number 825, the relay UE (e.g., using antenna 252, DEMOD 254, MIMO detector 256, receive processor 258, controller/processor 280, and/or the like) may receive a PDCCH on the downlink connection 805. The PDCCH may schedule respective PSCCHs and PSSCHs on the sidelink connections 810 and 815. The relay UE (e.g., using antenna 252, DEMOD 254, MIMO detector 256, receive processor 258, controller/processor 280, and/or the like) may receive sidelink feedback on respective PSFCHs 830 and 835 on the sidelink connections 810 and 815. The corresponding timing of the PSFCHs on the uplink is shown by reference numbers 840 and 845. The relay UE (e.g., using controller/processor 280, transmit processor 264, TX MIMO processor 266, MOD 254, antenna 252, and/or the like) may transmit the sidelink feedback for the PSFCHs on a PUCCH 850. Respective gaps between the PSFCHs and the PUCCH are shown by reference numbers 855 and 860. It can be seen that, in the case of a lagging sidelink connection, the gap for the asynchronous connection is shorter than in the case of a synchronized sidelink connection. The gap may be shorter still in the case of a leading sidelink connection.

In some aspects, a base station may not have information indicating whether the sidelink connection 815 is a lagging connection or a leading connection. This leads to uncertainty in whether a gap 860 will satisfy a minimum processing time of a relay UE 120. Furthermore, the uncertainty in the sidelink connection 815's timing may cause uncertainty as to how the sidelink feedback is to be mapped to the uplink connection 820. For example, the PSFCH shown on the uplink connection 820 by reference number 845 overlaps two adjacent slots, so the BS 110 may be uncertain as to which slot the PUCCH 850 should be mapped. This may occur even when SCSs of the sidelink connection 815 and the uplink connection 820 are the same. Techniques and apparatuses described herein provide synchronization of the sidelink connection 815 with the downlink connection 805. For example, the base station may indicate, to the UE, an assumption for aligning the sidelink connection 815's slot boundaries (which are collectively referred to as a slot structure) with the downlink connection 805's slot boundaries (which are collectively referred to as a slot structure). As another example, the UE may be preconfigured to align the slot structure in a particular direction (e.g., backward in time or forward in time), and the base station may take a timing difference associated with the aligned slot structure accordingly. Furthermore, techniques for mapping a PSFCH to a PUCCH when the PSFCH overlaps two or more slots are provided. Still further, a minimum PUCCH offset is provided to ensure that a gap between the PSFCH and the PUCCH satisfies a minimum processing time of the relay UE.

As indicated above, FIG. 8 is provided as an example. Other examples may differ from what is described with respect to FIG. 8.

Figure 9:
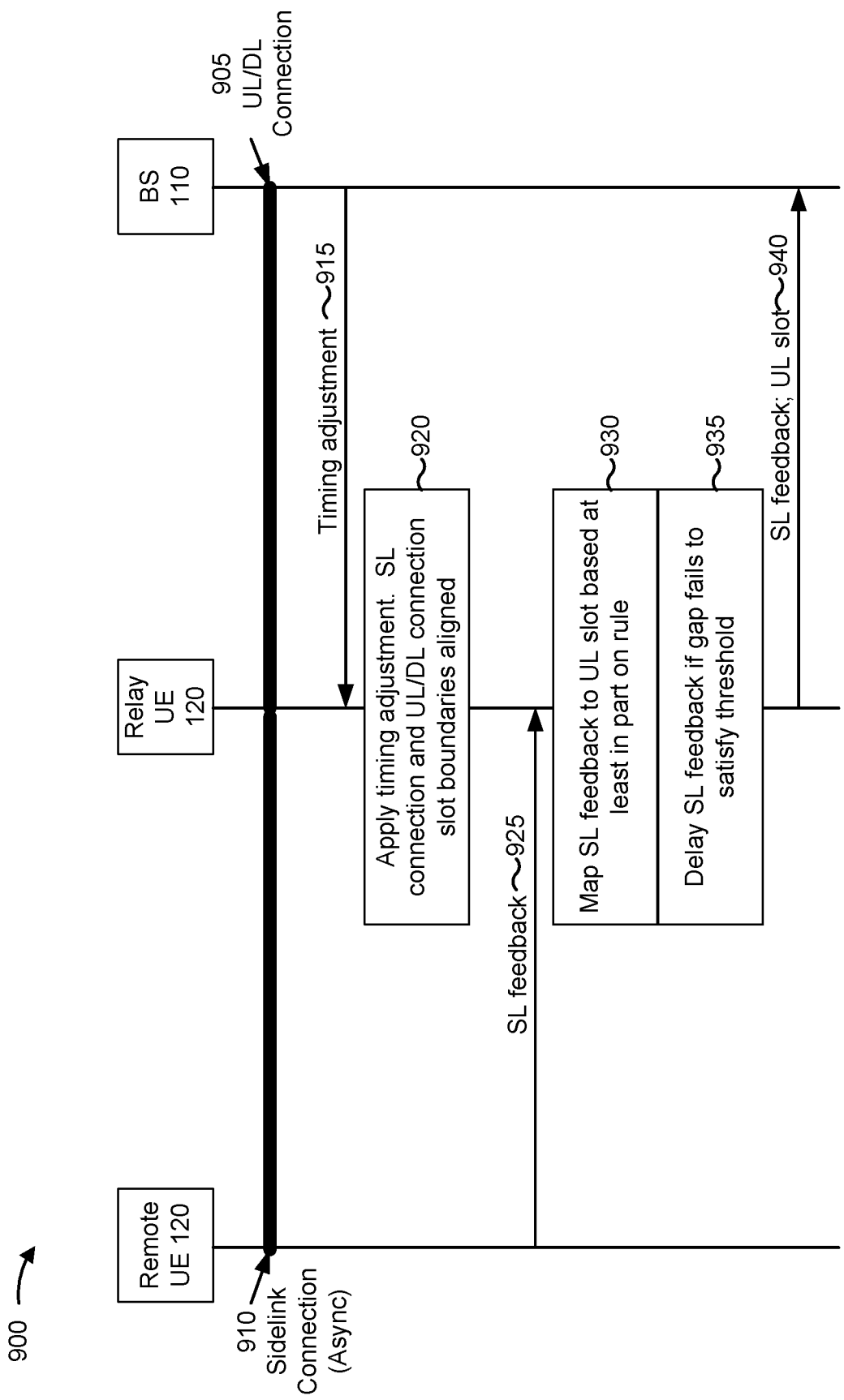
FIG. 9 is a diagram illustrating an example of alignment of a sidelink connection timing and an uplink connection timing, in accordance with the present disclosure.

FIG. 9 is a diagram illustrating an example 900 of alignment of a sidelink connection timing and an uplink connection timing, in accordance with the present disclosure. As shown, example 900 includes a BS 110, a relay UE 120 (e.g., UE 305, UE 405), and a remote UE 120 (e.g., UE 305, UE 405). As shown, the relay UE 120 and the BS 110 are associated with an uplink/downlink connection 905. The uplink/downlink connection 905 may be associated with a single carrier or bandwidth part, or may be associated with two or more different carriers or bandwidth parts. As shown, the relay UE 120 and the remote UE 120 are associated with a sidelink connection 910 that is asynchronous with the uplink/downlink connection 905. For example, the sidelink connection 910 may be synchronized to a different base station, or may be associated with a Global Navigation Satellite System timing. Thus, slot boundaries of the uplink/downlink connection 905 and the sidelink connection 910 may be misaligned with each other.

As shown by reference number 915, the BS 110 (e.g., using controller/processor 240, transmit processor 220, TX MIMO processor 230, MOD 232, antenna 234, and/or the like) may provide information indicating a timing adjustment for the sidelink connection 910. For example, the BS 110 may provide the information indicating the timing adjustment using radio resource control (RRC) signaling or another form of signaling. The timing adjustment may indicate whether the sidelink connection 910 is to be adjusted backward or forward. In some aspects, the timing adjustment may indicate an amount of time by which the sidelink connection 910 is to be moved. Thus, the BS 110 may have information indicating a direction in which the slot boundary is moved, thereby enabling the BS 110 to ensure that the minimum processing time of the relay UE 120 is satisfied.

As shown by reference number 920, the relay UE 120 (e.g., using antenna 252, DEMOD 254, MIMO detector 256, receive processor 258, controller/processor 280, transmit processor 264, TX MIMO processor 266, MOD 254, and/or the like) may apply the timing adjustment so that the sidelink connection 910 is slot boundary aligned with the uplink/downlink connection 905. For example, the relay UE 120 may apply the timing adjustment received from the BS 110. In some aspects, the relay UE 120 may determine a timing adjustment, or may apply a preconfigured timing adjustment. For example, the relay UE 120 may always move the slots backward or forward by a fixed amount of time, and the BS 110 may take into account the timing difference when scheduling the sidelink. In this case, the BS 110 may determine, based at least in part on respective slot indexes of the sidelink connection 910 and the uplink/downlink connection 905, an offset between the sidelink connection 910 and the uplink/downlink connection 905.

As shown by reference number 925, the relay UE 120 (e.g., using antenna 252, DEMOD 254, MIMO detector 256, receive processor 258, controller/processor 280, and/or the like) may receive sidelink feedback on the sidelink connection 910. For example, the relay UE 120 may receive the sidelink feedback in association with a PSCCH and/or a PSSCH transmitted to the remote UE 120 on the sidelink connection 910 (not shown). As further shown, the relay UE 120 (e.g., using controller/processor 280, transmit processor 264, TX MIMO processor 266, MOD 254, antenna 252, and/or the like) may map the sidelink feedback to an uplink slot based at least in part on a rule. For example, if a PSFCH resource associated with the sidelink feedback overlaps multiple uplink slots, the relay UE 120 may map the sidelink feedback to an uplink slot based at least in part on a rule. In some aspects, the relay UE 120 may select a first (e.g., earliest) overlapping uplink slot. For example, the relay UE 120 may always select the first overlapping uplink slot. In some aspects, the relay UE 120 may select a last (e.g., latest) overlapping uplink slot. For example, the relay UE 120 may always select the last overlapping uplink slot. In some aspects, the relay UE 120 may select a slot with a largest overlapped region with the PSFCH resource. If two slots are associated with a same size of overlapped region, or with overlapped regions that are within a specified error range, then the relay UE 120 may follow a rule of selecting a first overlapping uplink slot or selecting a last overlapping uplink slot. For example, the UE 120 may always pick the slot with the largest overlapping region with the PSFCH resource. In case of a tie, within an error range that may be specified, then the relay UE 120 may follow a rule of selecting a first overlapping uplink slot or selecting a last overlapping uplink slot. Since the BS 110 may have information indicating the rule and the PSFCH resource, the BS 110 can determine which slot the PSFCH is to be mapped to. Thus, the BS 110 can select timelines for the PSFCH and the PUCCH such that the minimum processing time for the relay UE 120 is satisfied.

As shown by reference number 935, in some aspects, the relay UE 120 may delay sidelink feedback if a gap fails to satisfy a threshold. For example, the gap may be between the end of the PSFCH and the start of the PUCCH, as shown by reference numbers 855 and 860 of FIG. 8. If the gap fails to satisfy the threshold associated with the relay UE 120's minimum processing time, then the relay UE 120 may postpone transmission of the PUCCH until the gap satisfies the threshold. Thus, the relay UE 120 may ensure that the relay UE 120's minimum processing time is satisfied. As shown by reference number 940, the relay UE 120 (e.g., using controller/processor 280, transmit processor 264, TX MIMO processor 266, MOD 254, antenna 252, and/or the like) may transmit the sidelink feedback on the selected uplink slot.

As indicated above, FIG. 9 is provided as an example. Other examples may differ from what is described with respect to FIG. 9.

Figure 10:
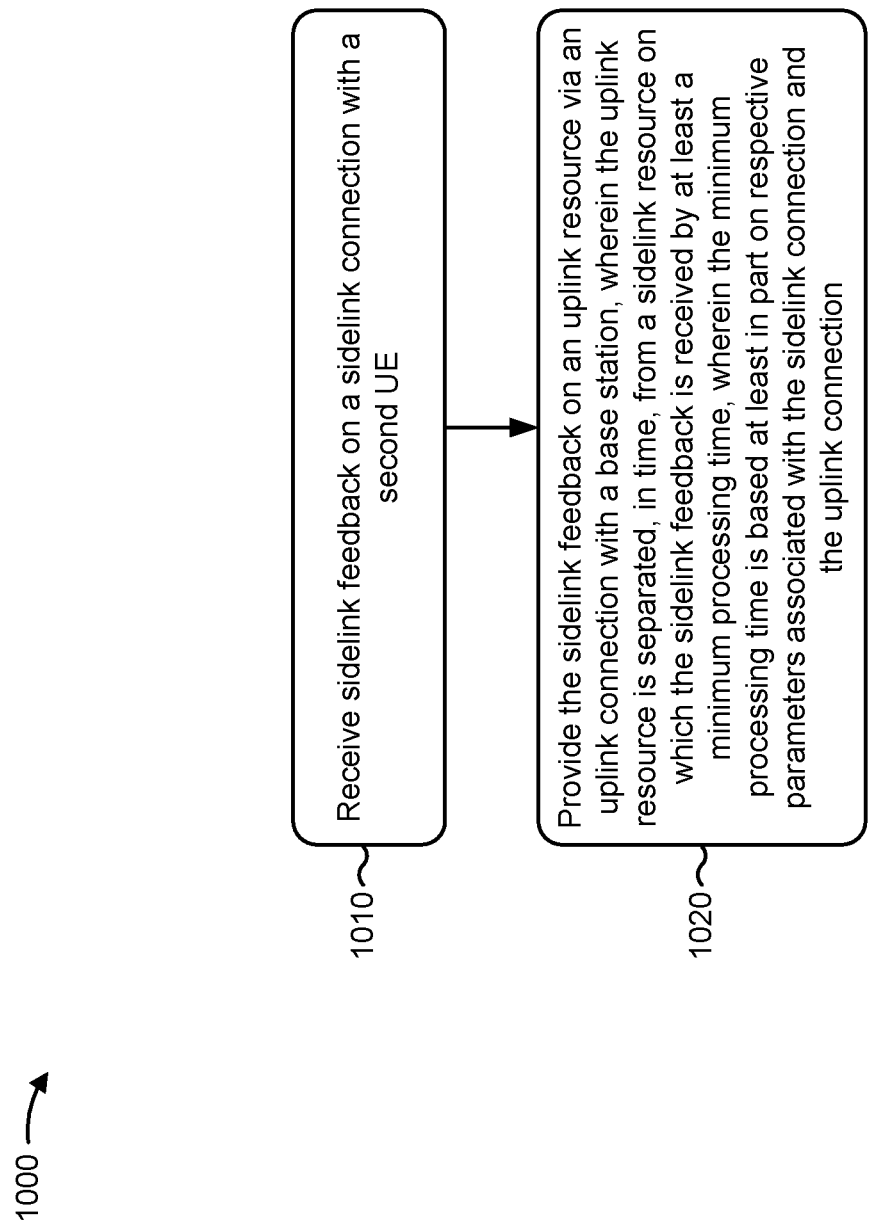
FIG. 10 is a diagram illustrating an example process performed, for example, by a user equipment, in accordance with the present disclosure.

FIG. 10 is a diagram illustrating an example process 1000 performed, for example, by a UE, in accordance with the present disclosure. Example process 1000 is an example where a first UE (e.g., UE 120, UE 305, UE 405, one or more of the relay UEs described herein, and/or the like) performs operations associated with HARQ timing adjustment for a sidelink connection.

As shown in FIG. 10, in some aspects, process 1000 may include receiving sidelink feedback on a sidelink connection with a second UE (block 1010). For example, the first UE (e.g., using antenna 252, DEMOD 254, MIMO detector 256, receive processor 258, controller/processor 280, and/or the like) may receive sidelink feedback on a sidelink connection with a second UE, as described above, for example, in connection with reference number 750 of FIG. 7 and reference number 925 of FIG. 9.

As further shown in FIG. 10, in some aspects, process 1000 may include providing the sidelink feedback on an uplink resource via an uplink connection with a base station, wherein the uplink resource is separated, in time, from a sidelink resource on which the sidelink feedback is received by at least a minimum processing time, wherein the minimum processing time is based at least in part on respective parameters associated with the sidelink connection and the uplink connection (block 1020). For example, the first UE (e.g., using controller/processor 280, transmit processor 264, TX MIMO processor 266, MOD 254, antenna 252, and/or the like) may provide the sidelink feedback on an uplink resource via an uplink connection with a base station, as described above, for example, in connection with reference numbers 760 of FIG. 7 and 940 of FIG. 9. In some aspects, the uplink resource is separated, in time, from a sidelink resource on which the sidelink feedback is received by at least a minimum processing time, as described in connection with reference number 740 of FIG. 7. In some aspects, the minimum processing time is based at least in part on respective parameters associated with the sidelink connection and the uplink connection, as described in connection with reference number 730 of FIG. 7.

Process 1000 may include additional aspects, such as any single aspect or any combination of aspects described below and/or in connection with one or more other processes described elsewhere herein.

In a first aspect, the sidelink feedback is received on a PSFCH and the uplink resource is associated with a PUCCH, and the minimum processing time is between an end of the PSFCH and a start of the PUCCH. In a second aspect, alone or in combination with the first aspect, the respective parameters comprise at least one of respective subcarrier spacings or respective minimum processing time capabilities associated with the sidelink connection and the uplink connection. In a third aspect, alone or in combination with one or more of the first and second aspects, the minimum processing time is determined based at least in part on at least one of a subcarrier spacing associated with the uplink connection or a minimum processing time capability associated with the uplink connection.

In a fourth aspect, alone or in combination with one or more of the first through third aspects, the minimum processing time is determined based at least in part on at least one of a subcarrier spacing associated with the sidelink connection or a minimum processing time capability associated with the sidelink connection. In a fifth aspect, alone or in combination with one or more of the first through fourth aspects, the minimum processing time is determined based at least in part on a smallest subcarrier spacing of the uplink connection and the sidelink connection, and based at least in part on a minimum processing time capability of the uplink connection. In a sixth aspect, alone or in combination with one or more of the first through fifth aspects, the minimum processing time is determined based at least in part on a smallest subcarrier spacing of the uplink connection and the sidelink connection, and based at least in part on a minimum processing time capability of the sidelink connection.

In a seventh aspect, alone or in combination with one or more of the first through sixth aspects, the minimum processing time is determined based at least in part on a smallest subcarrier spacing of the uplink connection and the sidelink connection, the minimum processing time is determined based at least in part on a slower minimum processing time capability if one or more of the sidelink connection and the uplink connection are configured with the slower minimum processing time capability, and the minimum processing time is determined based at least in part on a faster minimum processing time capability if the sidelink connection and the uplink connection are configured with the faster minimum processing time capability.

In an eighth aspect, alone or in combination with one or more of the first through seventh aspects, the minimum processing time is selected from respective minimum processing times of the uplink connection and the sidelink connection. In a ninth aspect, alone or in combination with one or more of the first through eighth aspects, the minimum processing time is configured as a semi-static value.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
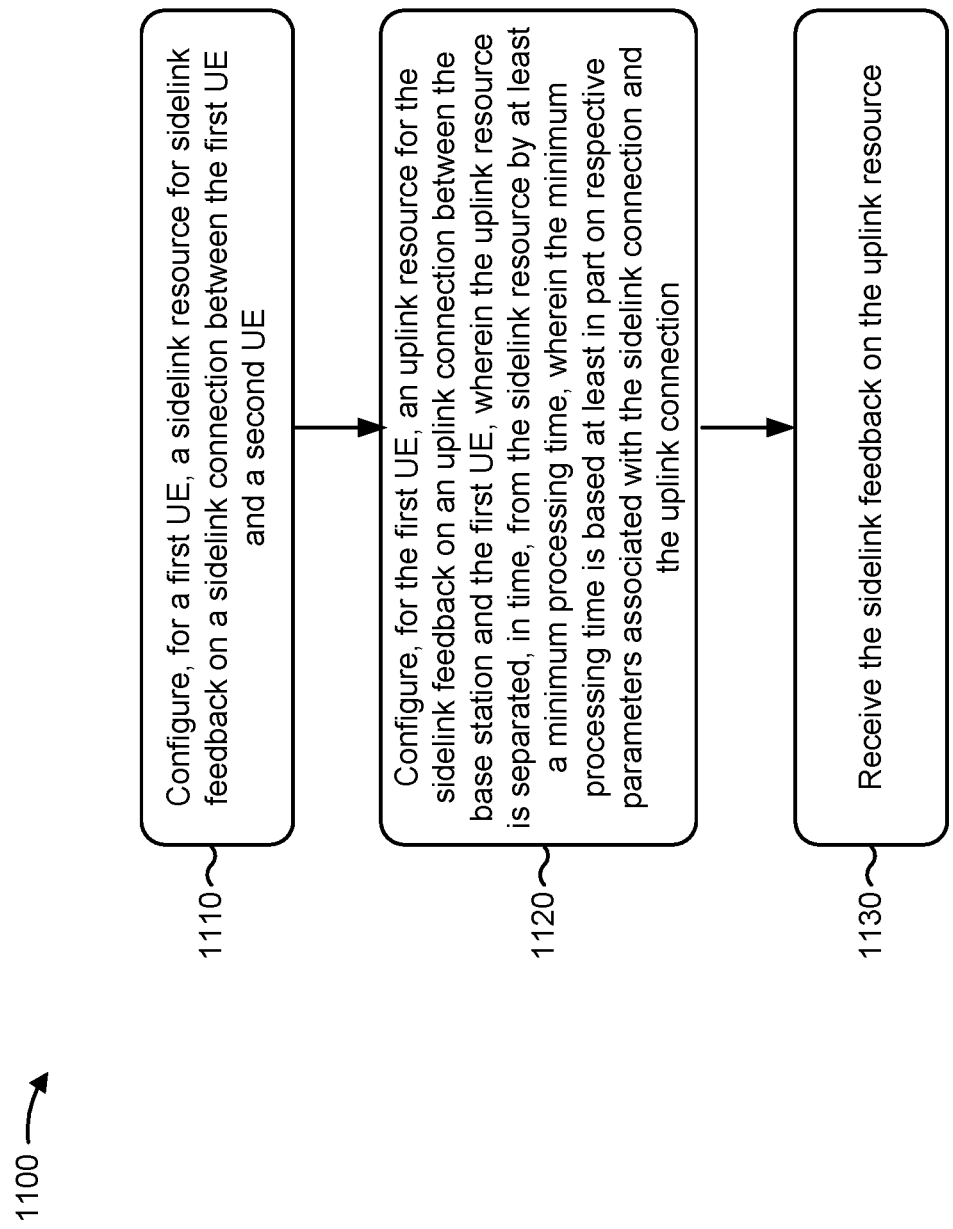
FIG. 11 is a diagram illustrating an example process performed, for example, by a base station, in accordance with the present disclosure.

FIG. 11 is a diagram illustrating an example process 1100 performed, for example, by a base station, in accordance with the present disclosure. Example process 1100 is an example where the base station (e.g., BS 110 and/or the like) performs operations associated with HARQ feedback timing alignment for sidelink communications.

As shown in FIG. 11, in some aspects, process 1100 may include configuring, for a first UE, a sidelink resource for sidelink feedback on a sidelink connection between the first UE and a second UE (block 1110). For example, the base station (e.g., using controller/processor 240, transmit processor 220, TX MIMO processor 230, MOD 232, antenna 234, and/or the like) may configure, for a first UE, a sidelink resource for sidelink feedback on a sidelink connection between the first UE and a second UE, as described above, for example, in connection with reference number 740 of FIG. 7.

As further shown in FIG. 11, in some aspects, process 1100 may include configuring, for the first UE, an uplink resource for the sidelink feedback on an uplink connection between the base station and the first UE, wherein the uplink resource is separated, in time, from the sidelink resource by at least a minimum processing time, wherein the minimum processing time is based at least in part on respective parameters associated with the sidelink connection and the uplink connection (block 1120). For example, the base station (e.g., using controller/processor 240, transmit processor 220, TX MIMO processor 230, MOD 232, antenna 234, and/or the like) may configure, for the first UE, an uplink resource for the sidelink feedback on an uplink connection between the base station and the first UE, as described above, for example, in connection with reference number 740 of FIG. 7. In some aspects, the uplink resource is separated, in time, from the sidelink resource by at least a minimum processing time as described above, for example, in connection with reference number 740 of FIG. 7. In some aspects, the minimum processing time is based at least in part on respective parameters associated with the sidelink connection and the uplink connection as described above, for example, in connection with reference number 730 of FIG. 7.

As further shown in FIG. 11, in some aspects, process 1100 may include receiving the sidelink feedback on the uplink resource (block 1130). For example, the base station (e.g., using antenna 234, DEMOD 232, MIMO detector 236, receive processor 238, controller/processor 240, and/or the like) may receive the sidelink feedback on the uplink resource, as described above, for example, in connection with reference number 760 of FIG. 7.

Process 1100 may include additional aspects, such as any single aspect or any combination of aspects described below and/or in connection with one or more other processes described elsewhere herein.

In a first aspect, the sidelink resource is associated with a PSFCH and the uplink resource is associated with a PUCCH, and the minimum processing time is between an end of the PSFCH and a start of the PUCCH. In a second aspect, alone or in combination with the first aspect, the respective parameters comprise at least one of respective subcarrier spacings or respective minimum processing time capabilities associated with the sidelink connection and the uplink connection. In a third aspect, alone or in combination with one or more of the first and second aspects, the minimum processing time is determined based at least in part on at least one of a subcarrier spacing associated with the uplink connection or a minimum processing time capability associated with the uplink connection.

In a fourth aspect, alone or in combination with one or more of the first through third aspects, the minimum processing time is determined based at least in part on at least one of a subcarrier spacing associated with the sidelink connection or a minimum processing time capability associated with the sidelink connection. In a fifth aspect, alone or in combination with one or more of the first through fourth aspects, the minimum processing time is determined based at least in part on a smallest subcarrier spacing of the uplink connection and the sidelink connection, and based at least in part on a minimum processing time capability of the uplink connection.

In a sixth aspect, alone or in combination with one or more of the first through fifth aspects, the minimum processing time is determined based at least in part on a smallest subcarrier spacing of the uplink connection and the sidelink connection, and based at least in part on a minimum processing time capability of the sidelink connection. In a seventh aspect, alone or in combination with one or more of the first through sixth aspects, the minimum processing time is determined based at least in part on a smallest subcarrier spacing of the uplink connection and the sidelink connection, the minimum processing time is determined based at least in part on a slower minimum processing time capability if one or more of the sidelink connection and the uplink connection are configured with the slower minimum processing time capability, and the minimum processing time is determined based at least in part on a faster minimum processing time capability if the sidelink connection and the uplink connection are configured with the faster minimum processing time capability.

In an eighth aspect, alone or in combination with one or more of the first through seventh aspects, the minimum processing time is selected from respective minimum processing times of the uplink connection and the sidelink connection. In a ninth aspect, alone or in combination with one or more of the first through eighth aspects, the minimum processing time is configured as a semi-static value.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
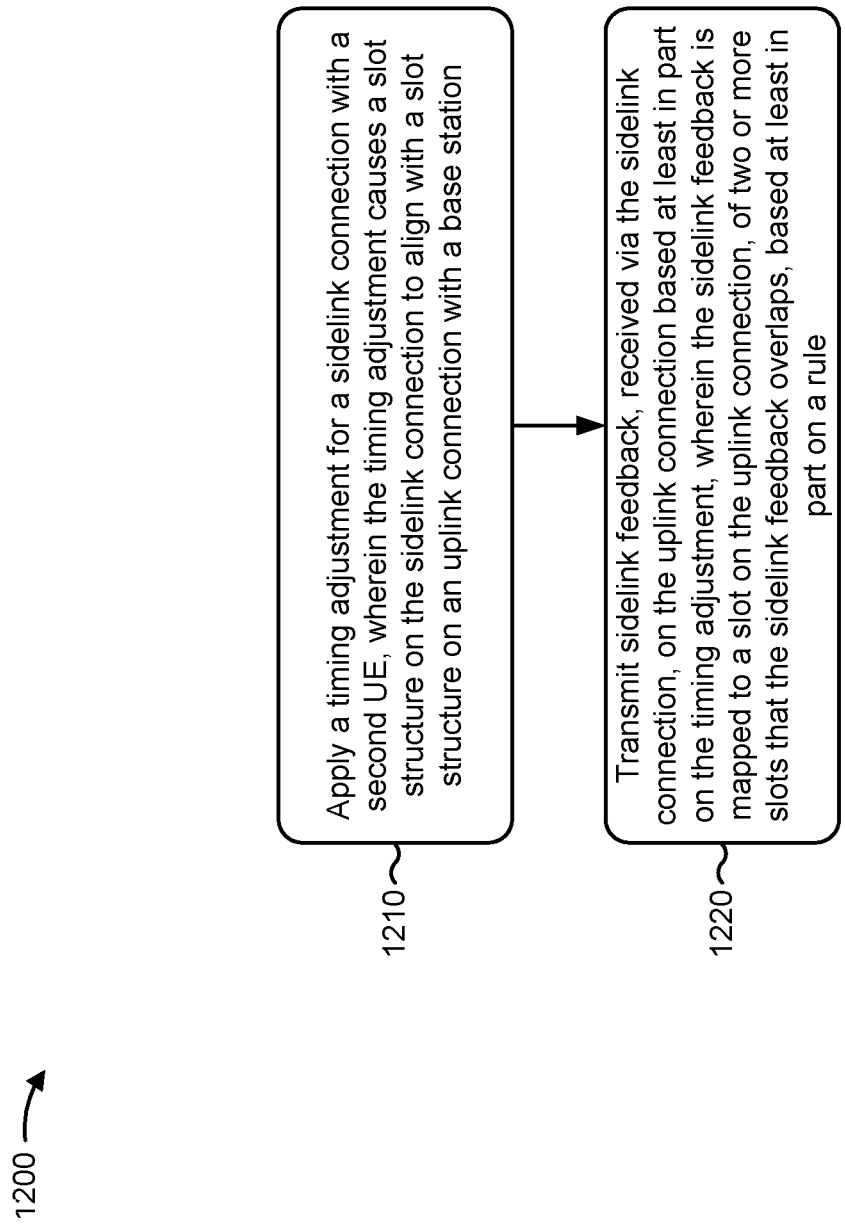
FIG. 12 is a diagram illustrating an example process performed, for example, by a user equipment, in accordance with the present disclosure.

FIG. 12 is a diagram illustrating an example process 1200 performed, for example, by a UE, in accordance with the present disclosure. Example process 1200 is an example where a first UE (e.g., UE 120 and/or the like) performs operations associated with timing alignment for HARQ feedback for a sidelink connection.

As shown in FIG. 12, in some aspects, process 1200 may include applying a timing adjustment for a sidelink connection with a second UE, wherein the timing adjustment causes a slot structure on the sidelink connection to align with a slot structure on an uplink connection with a base station (block 1210). For example, the first UE (e.g., using antenna 252, DEMOD 254, MIMO detector 256, receive processor 258, controller/processor 280, and/or the like) may apply a timing adjustment for a sidelink connection with a second UE, as described above, for example, in connection with reference number 920 of FIG. 9. In some aspects, the timing adjustment causes a slot structure on the sidelink connection to align with a slot structure on an uplink connection with a base station, as described above, for example, in connection with reference number 920 of FIG. 9.

As further shown in FIG. 12, in some aspects, process 1200 may include transmitting sidelink feedback, received via the sidelink connection, on the uplink connection based at least in part on the timing adjustment, wherein the sidelink feedback is mapped to a slot on the uplink connection, of two or more slots that the sidelink feedback overlaps, based at least in part on a rule (block 1220). For example, the first UE (e.g., using controller/processor 280, transmit processor 264, TX MIMO processor 266, MOD 254, antenna 252, and/or the like) may transmit sidelink feedback, received via the sidelink connection, on the uplink connection, as described above, for example, in connection with reference number 940 of FIG. 9. In some aspects, the first UE may transmit the sidelink feedback based at least in part on the timing adjustment, such as at a time or in a slot indicated by the timing adjustment. In some aspects, the sidelink feedback is mapped to a slot on the uplink connection, of two or more slots that the sidelink feedback overlaps, based at least in part on a rule, as described above, for example, in connection with reference number 930 of FIG. 9.

Process 1200 may include additional aspects, such as any single aspect or any combination of aspects described below and/or in connection with one or more other processes described elsewhere herein.

In a first aspect, the timing adjustment indicates whether to move the slot structure on the sidelink connection forward or backward in time. In a second aspect, alone or in combination with the first aspect, process 1200 includes receiving information identifying the timing adjustment via radio resource control signaling. In a third aspect, alone or in combination with one or more of the first and second aspects, scheduling information associated with the sidelink feedback is based at least in part on a particular direction in which the first UE is pre-configured to move the slot structure on the sidelink connection to align with the slot structure on the uplink connection.

In a fourth aspect, alone or in combination with one or more of the first through third aspects, the rule indicates that the slot on the uplink connection is an earliest slot of the two or more slots. In a fifth aspect, alone or in combination with one or more of the first through fourth aspects, the rule indicates that the slot on the uplink connection is a latest slot of the two or more slots. In a sixth aspect, alone or in combination with one or more of the first through fifth aspects, the rule indicates that the slot on the uplink connection is a slot, of the two or more slots, associated with a largest overlap with a sidelink slot in which the sidelink feedback was received.

In a seventh aspect, alone or in combination with one or more of the first through sixth aspects, the slot on the uplink connection is a selected slot, and the method further comprises: determining that a gap between a scheduled slot on the uplink connection that is scheduled for the sidelink feedback, and a sidelink slot in which the sidelink feedback is received, fails to satisfy a threshold, and selecting the selected slot based at least in part on a gap between the sidelink slot and the selected slot satisfying the threshold, as described above, for example, in connection with reference number 935 of FIG. 9.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
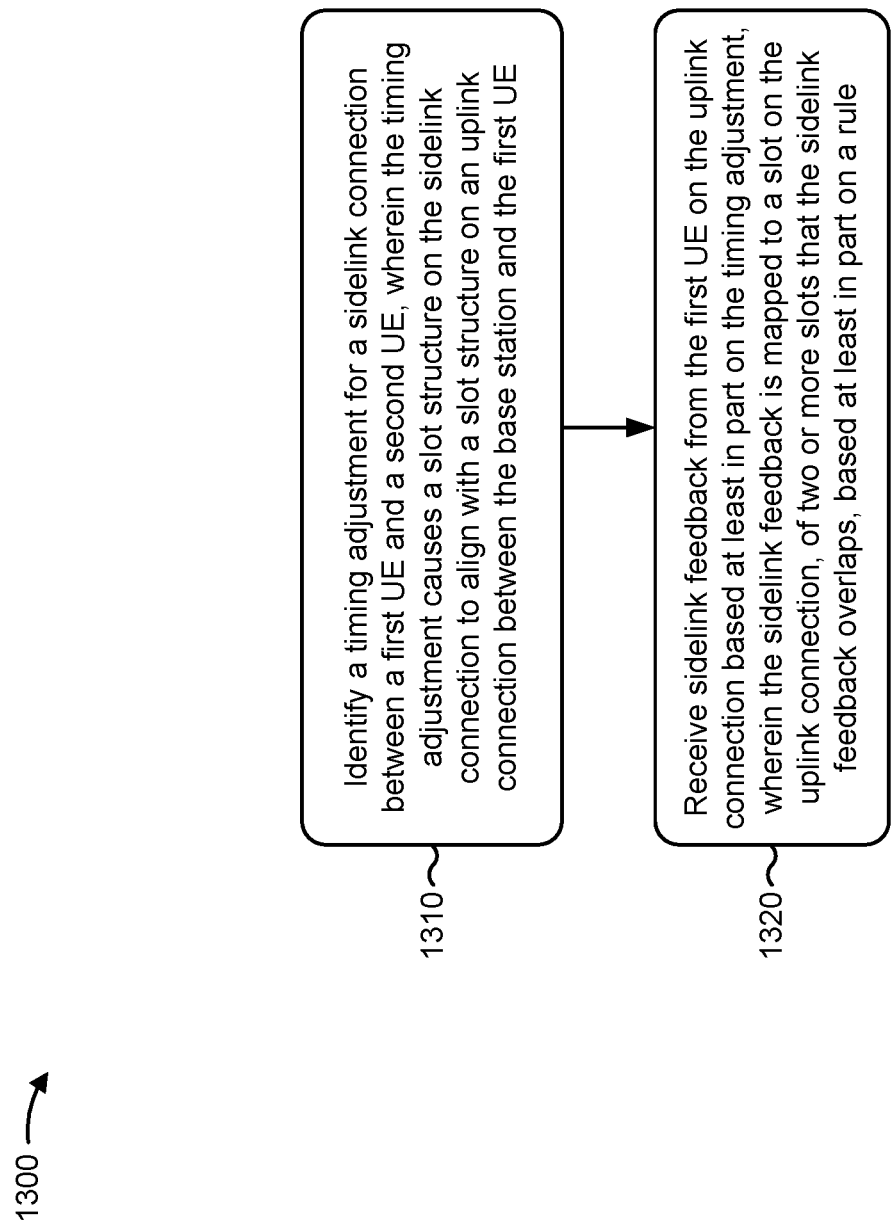
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., BS 110 and/or the like) performs operations associated with timing alignment for HARQ feedback for a sidelink connection.

As shown in FIG. 13, in some aspects, process 1300 may include identifying a timing adjustment for a sidelink connection between a first UE and a second UE, wherein the timing adjustment causes a slot structure on the sidelink connection to align with a slot structure on an uplink connection between the base station and the first UE (block 1310). For example, the base station (e.g., using controller/processor 240 and/or the like) may identify (e.g., determine, receive information indicating) a timing adjustment for a sidelink connection between a first UE and a second UE, as described above, for example, in connection with reference number 915 of FIG. 9. In some aspects, the timing adjustment causes a slot structure on the sidelink connection to align with a slot structure on an uplink connection between the base station and the first UE, as described above, for example, in connection with reference number 920 of FIG. 9.

As further shown in FIG. 13, in some aspects, process 1300 may include receiving sidelink feedback from the first UE on the uplink connection based at least in part on the timing adjustment, wherein the sidelink feedback is mapped to a slot on the uplink connection, of two or more slots that the sidelink feedback overlaps, based at least in part on a rule (block 1320). For example, the base station (e.g., using antenna 234, DEMOD 232, MIMO detector 236, receive processor 238, controller/processor 240, and/or the like) may receive sidelink feedback from the first UE on the uplink connection based at least in part on the timing adjustment, as described above, for example, in connection with reference number 940 of FIG. 9. In some aspects, the sidelink feedback is mapped to a slot on the uplink connection, of two or more slots that the sidelink feedback overlaps, based at least in part on a rule, as described above, for example, in connection with reference number 930 of FIG. 9.

Process 1300 may include additional aspects, such as any single aspect or any combination of aspects described below and/or in connection with one or more other processes described elsewhere herein.

In a first aspect, the timing adjustment indicates whether to move the slot structure on the sidelink connection forward or backward in time. In a second aspect, alone or in combination with the first aspect, process 1300 includes transmitting information identifying the timing adjustment via radio resource control signaling.

In a third aspect, alone or in combination with one or more of the first and second aspects, process 1300 further comprises scheduling the sidelink feedback in accordance with a particular direction in which the slot structure on the sidelink connection is pre-configured to move as a result of the timing adjustment and based at least in part on identifying a slot offset between the sidelink connection and the uplink connection. In a fourth aspect, alone or in combination with one or more of the first through third aspects, the rule indicates that the slot on the uplink connection is an earliest slot of the two or more slots.

In a fifth aspect, alone or in combination with one or more of the first through fourth aspects, the rule indicates that the slot on the uplink connection is a latest slot of the two or more slots. In a sixth aspect, alone or in combination with one or more of the first through fifth aspects, the rule indicates that the slot on the uplink connection is a slot, of the two or more slots, associated with a largest overlap with a sidelink slot in which the sidelink feedback was received, as described above, for example, in connection with reference number 935 of FIG. 9.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
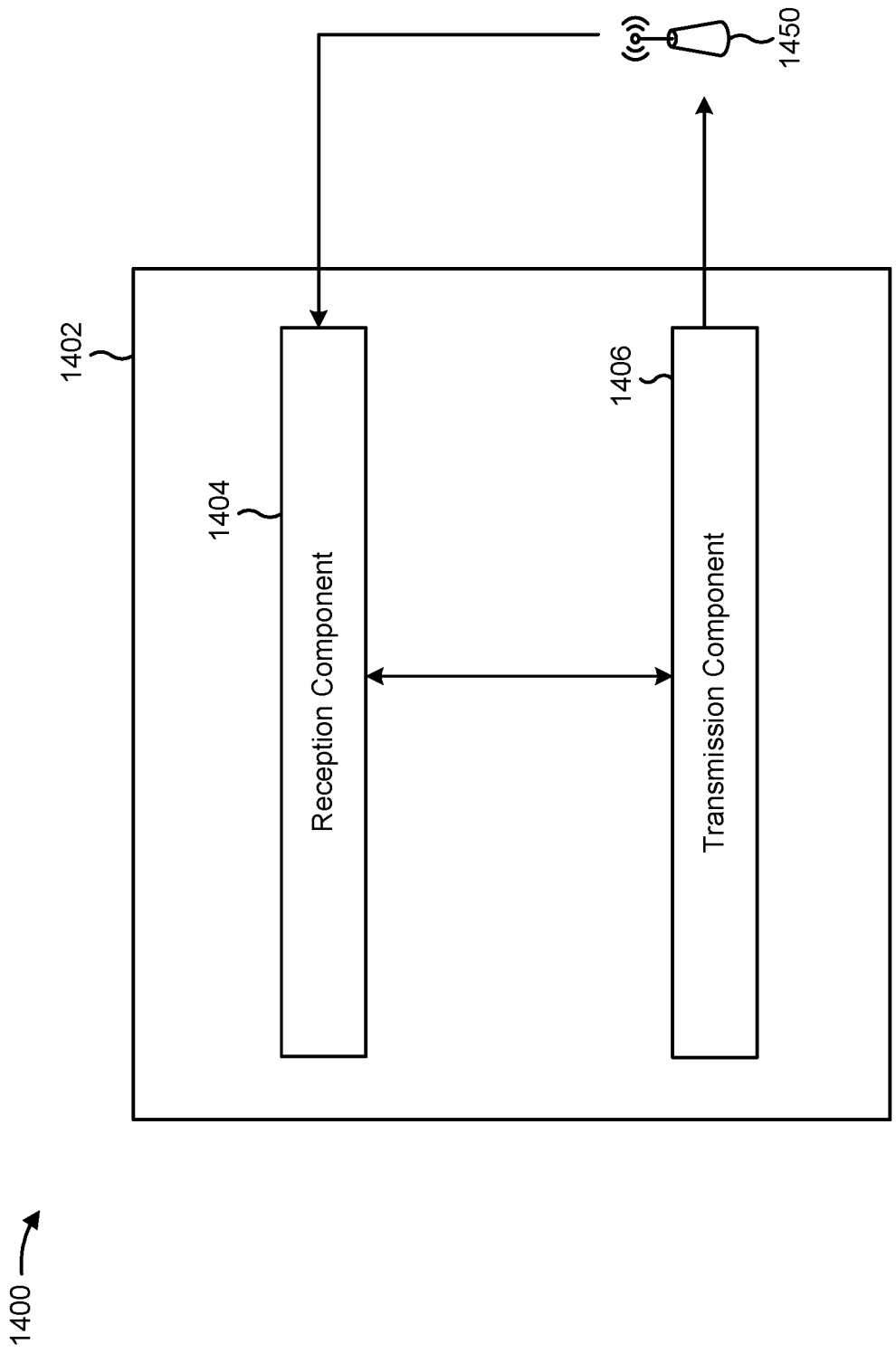
FIG. 14 is a data flow diagram illustrating an example of a data flow between different components in an example apparatus, in accordance with the present disclosure.

FIG. 14 is a conceptual data flow diagram 1400 illustrating a data flow between different components in an example apparatus 1402. The apparatus 1402 may be a UE (e.g., UE 120, a first UE, UE 305, UE 405, a relay UE). In some aspects, the apparatus 1402 includes a reception component 1404 and/or a transmission component 1406.

The reception component 1404 may receive, from a second UE 1450, sidelink feedback on a sidelink connection with the second UE 1450. The transmission component 1406 may transmit (e.g., provide) the sidelink feedback on an uplink resource via an uplink connection with a base station.

The apparatus may include additional components that perform each of the blocks of the algorithm in the aforementioned process 1000 of FIG. 10 and/or the like. Each block in the aforementioned process 1000 of FIG. 10 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of components (e.g., one or more components) shown in FIG. 14 may perform one or more functions described as being performed by another set of components shown in FIG. 14.

Figure 15:
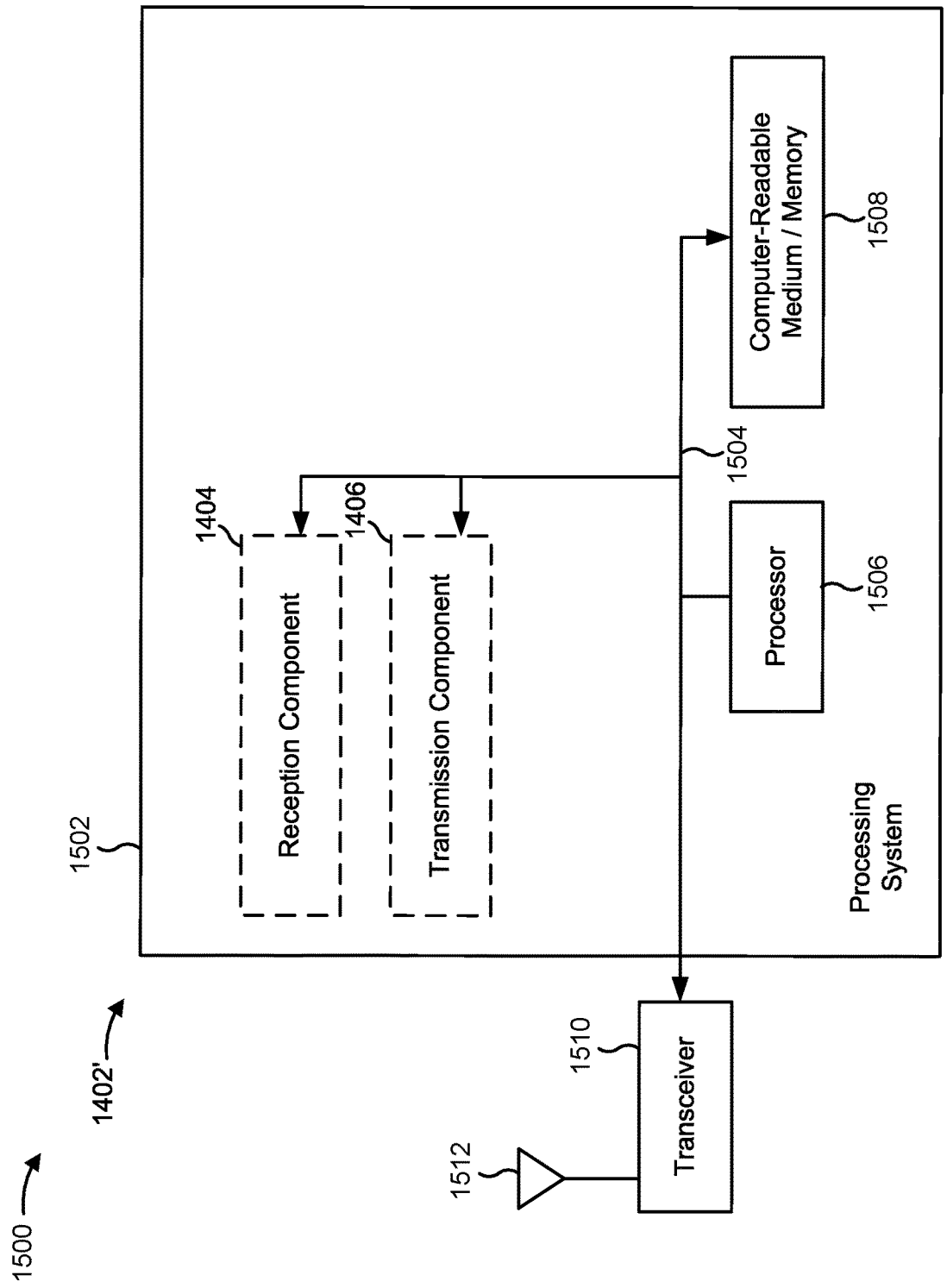
FIG. 15 is a diagram illustrating an example of a hardware implementation for an apparatus employing a processing system, in accordance with the present disclosure.

FIG. 15 is a diagram 1500 illustrating an example of a hardware implementation for an apparatus 1402' employing a processing system 1502. The apparatus 1402' may be a UE (e.g., UE 120).

The processing system 1502 may be implemented with a bus architecture, represented generally by the bus 1504. The bus 1504 may include any number of interconnecting buses and bridges depending on the specific application of the processing system 1502 and the overall design constraints. The bus 1504 links together various circuits including one or more processors and/or hardware components, represented by the processor 1506, the components 1404 and/or 1406, and the computer-readable medium/memory 1508. The bus 1504 may also link various other circuits such as timing sources, peripherals, voltage regulators, and power management circuits, which are well known in the art, and therefore will not be described any further.

The processing system 1502 may be coupled to a transceiver 1510. The transceiver 1510 is coupled to one or more antennas 1512. The transceiver 1510 provides a means for communicating with various other apparatuses over a transmission medium. The transceiver 1510 receives a signal from the one or more antennas 1512, extracts information from the received signal, and provides the extracted information to the processing system 1502, specifically the reception component 1404. In addition, the transceiver 1510 receives information from the processing system 1502, specifically the transmission component 1406, and based at least in part on the received information, generates a signal to be applied to the one or more antennas 1512. The processing system 1502 includes a processor 1506 coupled to a computer-readable medium/memory 1508. The processor 1506 is responsible for general processing, including the execution of software stored on the computer-readable medium/memory 1508. The software, when executed by the processor 1506, causes the processing system 1502 to perform the various functions described herein for any particular apparatus. The computer-readable medium/memory 1508 may also be used for storing data that is manipulated by the processor 1506 when executing software. The processing system further includes at least one of the components 1404 and/or 1406. The components may be software modules running in the processor 1506, resident/stored in the computer readable medium/memory 1508, one or more hardware modules coupled to the processor 1506, or some combination thereof. The processing system 1502 may be a component of the UE 120 and may include the memory 282 and/or at least one of the TX MIMO processor 266, the RX processor 258, and/or the controller/processor 280.

In some aspects, the apparatus 1402/1402' for wireless communication includes means for receiving sidelink feedback on a sidelink connection with a second UE; means for providing the sidelink feedback on an uplink resource via an uplink connection with a base station; and/or the like. The aforementioned means may be one or more of the aforementioned components of the apparatus 1402 and/or the processing system 1502 of the apparatus 1402' configured to perform the functions recited by the aforementioned means. As described elsewhere herein, the processing system 1502 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 15 is provided as an example. Other examples may differ from what is described in connection with FIG. 15.

Figure 16:
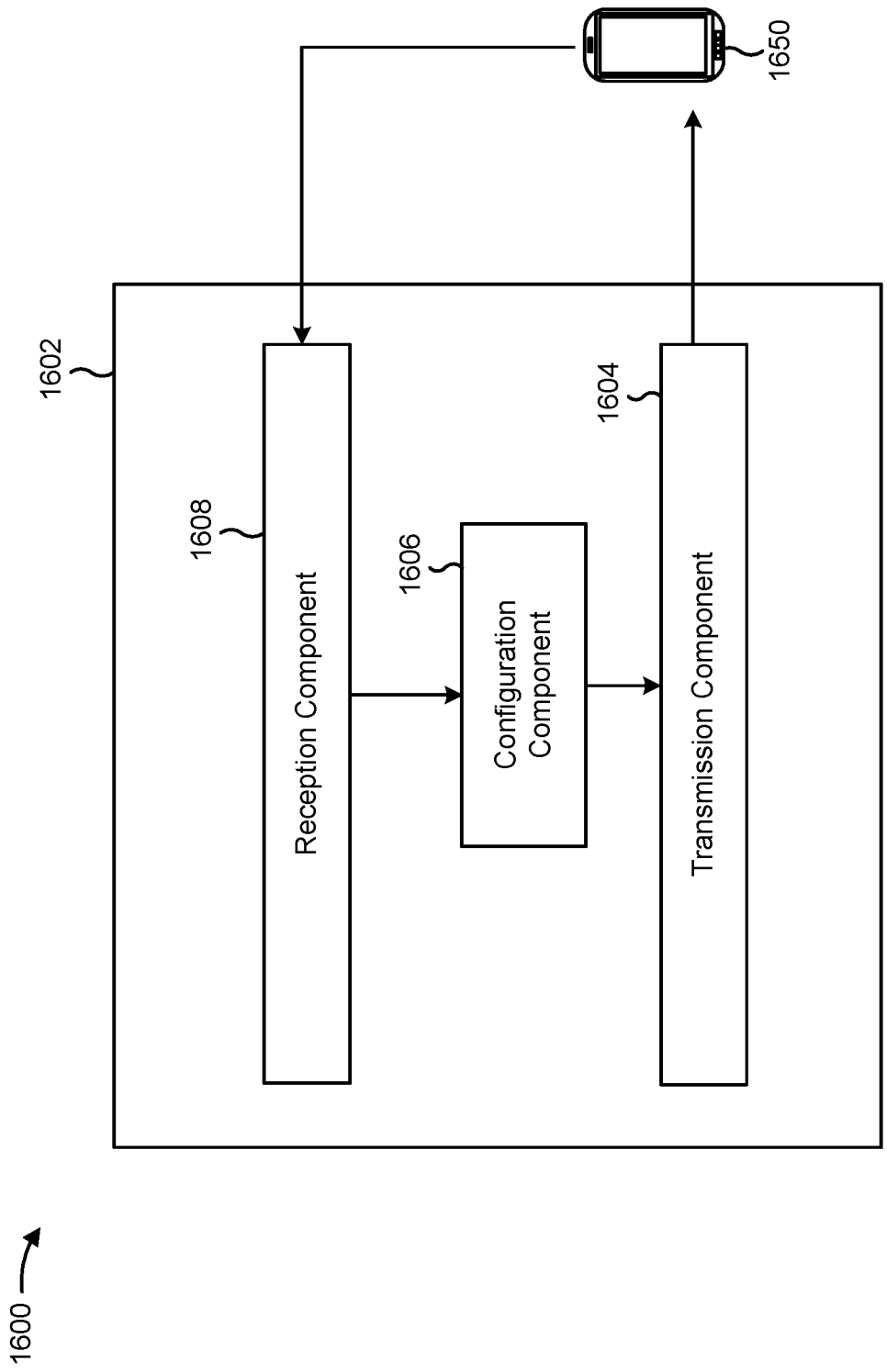
FIG. 16 is a data flow diagram illustrating an example of a data flow between different components in an example apparatus, in accordance with the present disclosure.

FIG. 16 is a data flow diagram 1600 illustrating a data flow between different components in an example apparatus 1602. The apparatus 1602 may be a base station (e.g., base station 110). In some aspects, the apparatus 1602 includes a transmission component 1604, a configuration component 1606, and/or a reception component 1608.

The transmission component 1604 may transmit configuration information to a UE 1650 (e.g., a relay UE, UE 120, UE 305, UE 405, a first UE). The configuration component 1606 may generate the configuration information. For example, the configuration component 1606 may configure, for the UE 1650, a sidelink resource for sidelink feedback on a sidelink connection between the UE 1650 and a second UE; and configure, for the UE 1650, an uplink resource for the sidelink feedback on an uplink connection between the base station and the UE 1650. The reception component 1608 may receive the sidelink feedback on the uplink resource (e.g., from the UE 1650).

The apparatus may include additional components that perform each of the blocks of the algorithm in the aforementioned process 1100 of FIG. 11 and/or the like. Each block in the aforementioned process 1100 of FIG. 11 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of components (e.g., one or more components) shown in FIG. 16 may perform one or more functions described as being performed by another set of components shown in FIG. 16.

Figure 17:
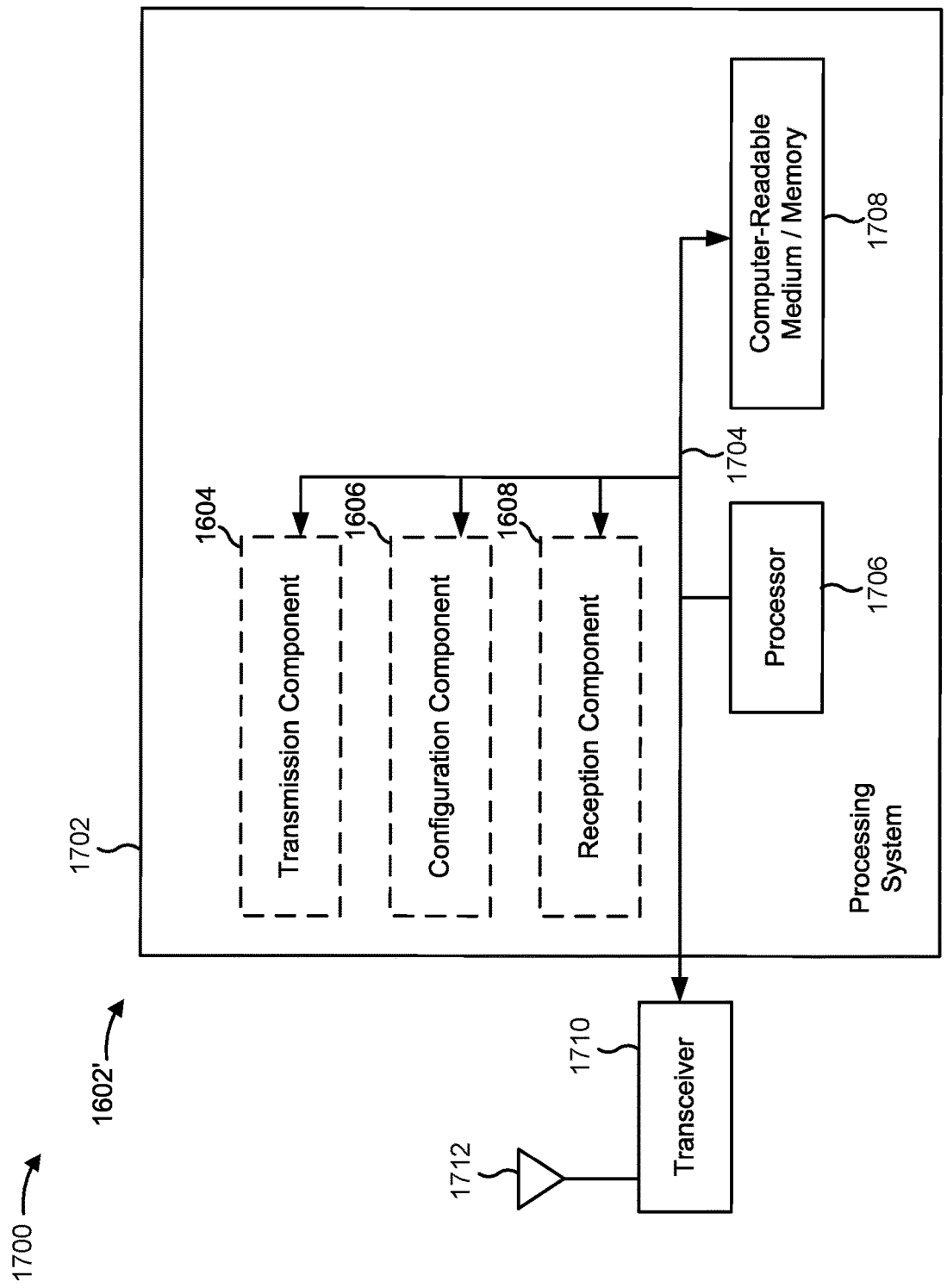
FIG. 17 is a diagram illustrating an example of a hardware implementation for an apparatus employing a processing system, in accordance with the present disclosure.

FIG. 17 is a diagram 1700 illustrating an example of a hardware implementation for an apparatus 1602' employing a processing system 1702. The apparatus 1602' may be a base station (e.g., base station 110).

The processing system 1702 may be implemented with a bus architecture, represented generally by the bus 1704. The bus 1704 may include any number of interconnecting buses and bridges depending on the specific application of the processing system 1702 and the overall design constraints. The bus 1704 links together various circuits including one or more processors and/or hardware components, represented by the processor 1706, the components 1604, 1606, and/or 1608, and the computer-readable medium/memory 1708. The bus 1704 may also link various other circuits such as timing sources, peripherals, voltage regulators, and power management circuits, which are well known in the art, and therefore will not be described any further.

The processing system 1702 may be coupled to a transceiver 1710. The transceiver 1710 is coupled to one or more antennas 1712. The transceiver 1710 provides a means for communicating with various other apparatuses over a transmission medium. The transceiver 1710 receives a signal from the one or more antennas 1712, extracts information from the received signal, and provides the extracted information to the processing system 1702, specifically the reception component 1608. In addition, the transceiver 1710 receives information from the processing system 1702, specifically the transmission component 1604, and based at least in part on the received information, generates a signal to be applied to the one or more antennas 1712. The processing system 1702 includes a processor 1706 coupled to a computer-readable medium/memory 1708. The processor 1706 is responsible for general processing, including the execution of software stored on the computer-readable medium/memory 1708. The software, when executed by the processor 1706, causes the processing system 1702 to perform the various functions described herein for any particular apparatus. The computer-readable medium/memory 1708 may also be used for storing data that is manipulated by the processor 1706 when executing software. The processing system further includes at least one of the components 1604, 1606, and/or 1608. The components may be software modules running in the processor 1706, resident/stored in the computer readable medium/memory 1708, one or more hardware modules coupled to the processor 1706, or some combination thereof. The processing system 1702 may be a component of the base station 110 and may include the memory 242 and/or at least one of the TX MIMO processor 230, the RX processor 238, and/or the controller/processor 240.

In some aspects, the apparatus 1602/1602' for wireless communication includes means for configuring, for a first UE, a sidelink resource for sidelink feedback on a sidelink connection between the first UE and a second UE; means for configuring, for the first UE, an uplink resource for the sidelink feedback on an uplink connection between the base station and the first UE; means for receiving the sidelink feedback on the uplink resource; and/or the like. The aforementioned means may be one or more of the aforementioned components of the apparatus 1602 and/or the processing system 1702 of the apparatus 1602' configured to perform the functions recited by the aforementioned means. As described elsewhere herein, the processing system 1702 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 17 is provided as an example. Other examples may differ from what is described in connection with FIG. 17.

Figure 18:
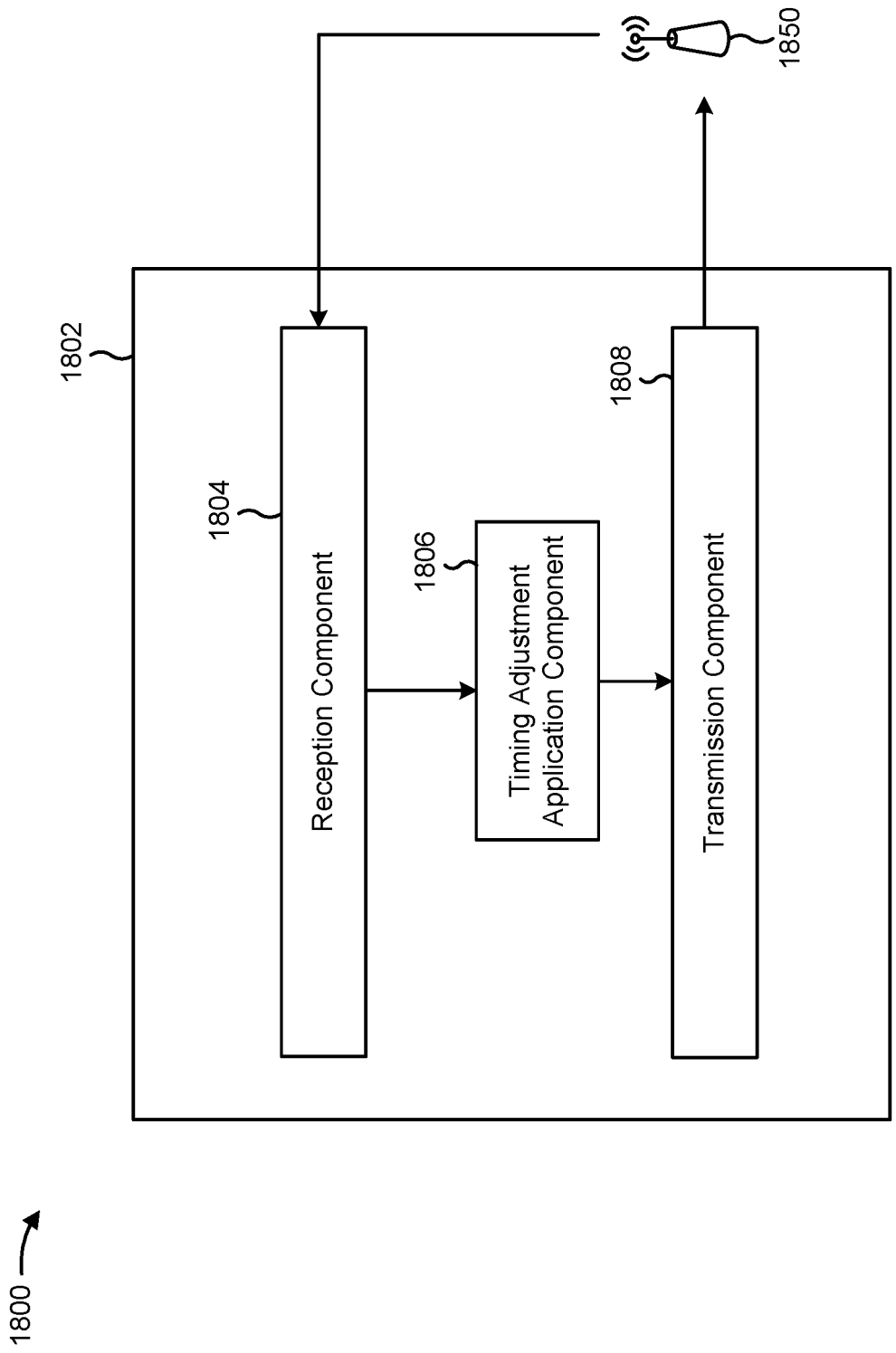
FIG. 18 is a data flow diagram illustrating an example of a data flow between different components in an example apparatus, in accordance with the present disclosure.

FIG. 18 is a data flow diagram 1800 illustrating a data flow between different components in an example apparatus 1802. The apparatus 1802 may be a UE (e.g., UE 120). In some aspects, the apparatus 1802 includes a reception component 1804, a timing adjustment application component 1806, and/or a transmission component 1808.

The timing adjustment application component 1806 (e.g., using the reception component 1804 and/or the transmission component 1808) may apply a timing adjustment for a sidelink connection with a second UE, wherein the timing adjustment causes a slot structure on the sidelink connection to align with a slot structure on an uplink connection with a base station. The transmission component 1808 may transmit sidelink feedback, received via the sidelink connection, on the uplink connection (e.g., to a base station 1850), wherein the sidelink feedback is mapped to a slot on the uplink connection, of two or more slots that the sidelink feedback overlaps, based at least in part on a rule.

The apparatus may include additional components that perform each of the blocks of the algorithm in the aforementioned process 1200 of FIG. 12 and/or the like. Each block in the aforementioned process 1200 of FIG. 12 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of components (e.g., one or more components) shown in FIG. 18 may perform one or more functions described as being performed by another set of components shown in FIG. 18.

Figure 19:
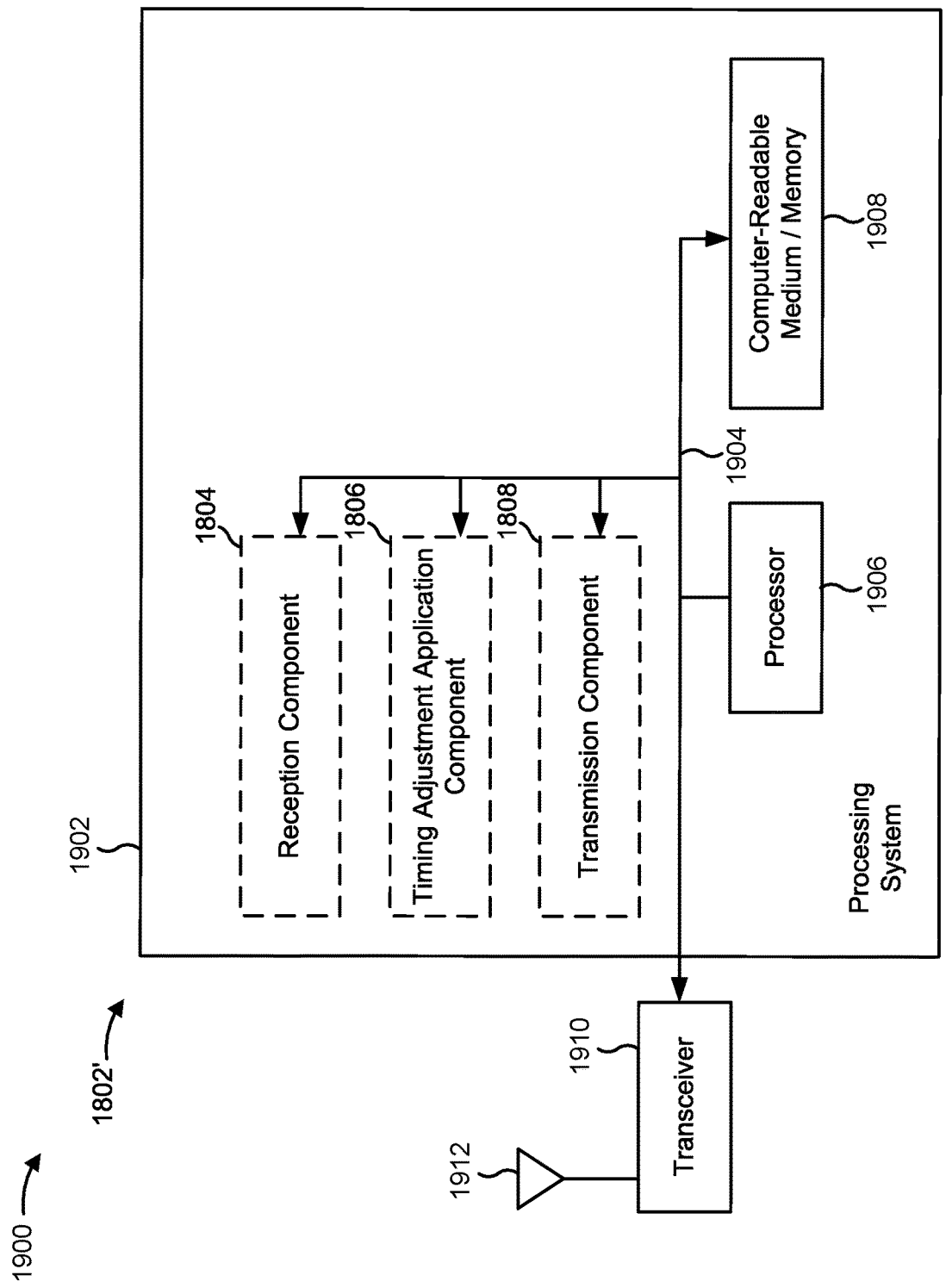
FIG. 19 is a diagram illustrating an example of a hardware implementation for an apparatus employing a processing system, in accordance with the present disclosure.

FIG. 19 is a diagram 1900 illustrating an example of a hardware implementation for an apparatus 1802' employing a processing system 1902. The apparatus 1802' may be a UE (e.g., UE 120).

The processing system 1902 may be implemented with a bus architecture, represented generally by the bus 1904. The bus 1904 may include any number of interconnecting buses and bridges depending on the specific application of the processing system 1902 and the overall design constraints. The bus 1904 links together various circuits including one or more processors and/or hardware components, represented by the processor 1906, the components 1804, 1806, and/or 1808, and the computer-readable medium/memory 1908. The bus 1904 may also link various other circuits such as timing sources, peripherals, voltage regulators, and power management circuits, which are well known in the art, and therefore will not be described any further.

The processing system 1902 may be coupled to a transceiver 1910. The transceiver 1910 is coupled to one or more antennas 1912. The transceiver 1910 provides a means for communicating with various other apparatuses over a transmission medium. The transceiver 1910 receives a signal from the one or more antennas 1912, extracts information from the received signal, and provides the extracted information to the processing system 1902, specifically the reception component 1804. In addition, the transceiver 1910 receives information from the processing system 1902, specifically the transmission component 1808, and based at least in part on the received information, generates a signal to be applied to the one or more antennas 1912. The processing system 1902 includes a processor 1906 coupled to a computer-readable medium/memory 1908. The processor 1906 is responsible for general processing, including the execution of software stored on the computer-readable medium/memory 1908. The software, when executed by the processor 1906, causes the processing system 1902 to perform the various functions described herein for any particular apparatus. The computer-readable medium/memory 1908 may also be used for storing data that is manipulated by the processor 1906 when executing software. The processing system further includes at least one of the components 1804, 1806, and/or 1808. The components may be software modules running in the processor 1906, resident/stored in the computer readable medium/memory 1908, one or more hardware modules coupled to the processor 1906, or some combination thereof. The processing system 1902 may be a component of the UE 120 and may include the memory 282 and/or at least one of the TX MIMO processor 266, the RX processor 258, and/or the controller/processor 280.

In some aspects, the apparatus 1802/1802' for wireless communication includes means for applying a timing adjustment for a sidelink connection with a second UE; means for transmitting sidelink feedback, received via the sidelink connection, on the uplink connection; means for receiving information identifying the timing adjustment via radio resource control signaling; means for determining that a gap between a scheduled slot on the uplink connection that is scheduled for the sidelink feedback, and a sidelink slot in which the sidelink feedback is received, fails to satisfy a threshold; means for selecting the selected slot based at least in part on a gap between the sidelink slot and the selected slot satisfying the threshold; and/or the like. The aforementioned means may be one or more of the aforementioned components of the apparatus 1802 and/or the processing system 1902 of the apparatus 1802' configured to perform the functions recited by the aforementioned means. As described elsewhere herein, the processing system 1902 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 19 is provided as an example. Other examples may differ from what is described in connection with FIG. 19.

Figure 20:
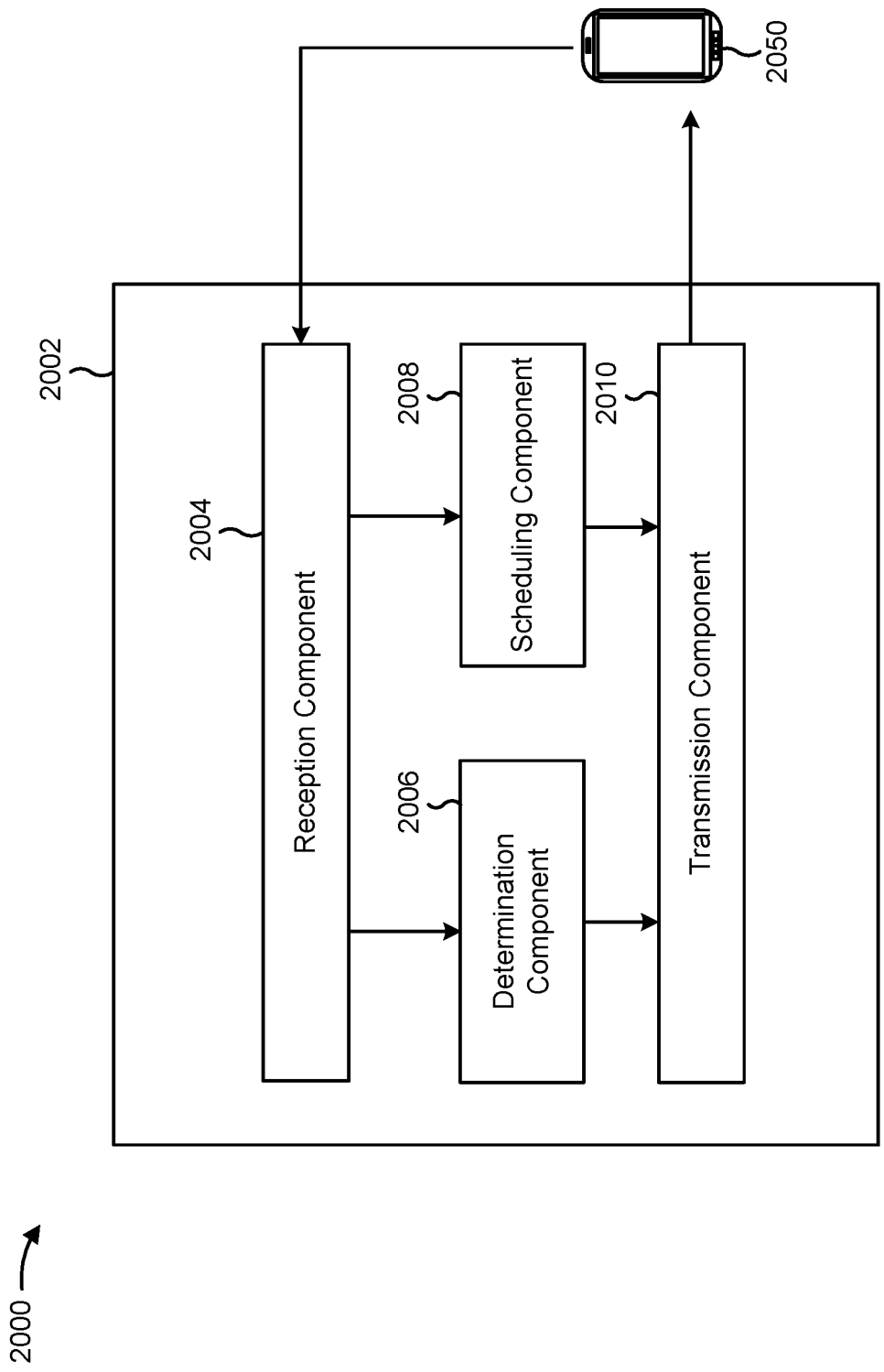
FIG. 20 is a data flow diagram illustrating an example of a data flow between different components in an example apparatus, in accordance with the present disclosure.

FIG. 20 is a data flow diagram 2000 illustrating a data flow between different components in an example apparatus 2002. The apparatus 2002 may be a base station (e.g., base station 110). In some aspects, the apparatus 2002 includes a reception component 2004, a determination component 2006, a scheduling component 2008, and/or a transmission component 2010.

The reception component 2004 may receive sidelink feedback from a first UE (e.g., UE 2050) on the uplink connection, wherein the sidelink feedback is mapped to a slot on the uplink connection, of two or more slots that the sidelink feedback overlaps, based at least in part on a rule. The determination component 2006 may determine a timing adjustment for a sidelink connection between a first UE and a second UE. The scheduling component 2008 may schedule the sidelink feedback in accordance with the particular direction and based at least in part on identifying a slot offset between the sidelink connection and the uplink connection. The transmission component 2010 may transmit information identifying the timing adjustment via radio resource control signaling.

The apparatus may include additional components that perform each of the blocks of the algorithm in the aforementioned process 1300 of FIG. 13 and/or the like. Each block in the aforementioned process 1300 of FIG. 13 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of components (e.g., one or more components) shown in FIG. 20 may perform one or more functions described as being performed by another set of components shown in FIG. 20.

Figure 21:
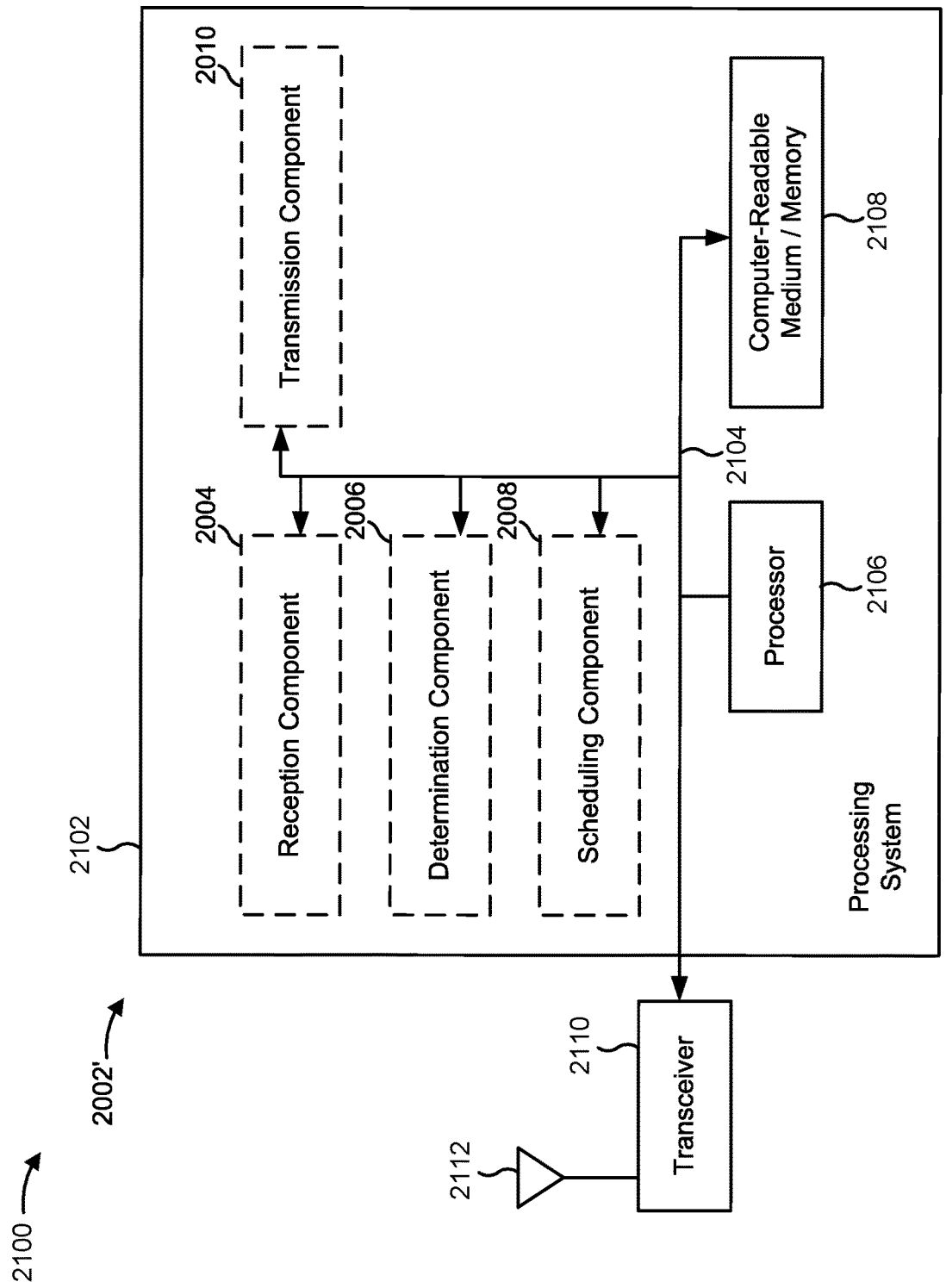
FIG. 21 is a diagram illustrating an example of a hardware implementation for an apparatus employing a processing system, in accordance with the present disclosure.

FIG. 21 is a diagram 2100 illustrating an example of a hardware implementation for an apparatus 2002' employing a processing system 2102. The apparatus 2002' may be a base station (e.g., base station 110).

The processing system 2102 may be implemented with a bus architecture, represented generally by the bus 2104. The bus 2104 may include any number of interconnecting buses and bridges depending on the specific application of the processing system 2102 and the overall design constraints. The bus 2104 links together various circuits including one or more processors and/or hardware components, represented by the processor 2106, the components 2004, 2006, 2008, and/or 2010, and the computer-readable medium/memory 2108. The bus 2104 may also link various other circuits such as timing sources, peripherals, voltage regulators, and power management circuits, which are well known in the art, and therefore will not be described any further.

The processing system 2102 may be coupled to a transceiver 2110. The transceiver 2110 is coupled to one or more antennas 2112. The transceiver 2110 provides a means for communicating with various other apparatuses over a transmission medium. The transceiver 2110 receives a signal from the one or more antennas 2112, extracts information from the received signal, and provides the extracted information to the processing system 2102, specifically the reception component 2004. In addition, the transceiver 2110 receives information from the processing system 2102, specifically the transmission component 2010, and based at least in part on the received information, generates a signal to be applied to the one or more antennas 2112. The processing system 2102 includes a processor 2106 coupled to a computer-readable medium/memory 2108. The processor 2106 is responsible for general processing, including the execution of software stored on the computer-readable medium/memory 2108. The software, when executed by the processor 2106, causes the processing system 2102 to perform the various functions described herein for any particular apparatus. The computer-readable medium/memory 2108 may also be used for storing data that is manipulated by the processor 2106 when executing software. The processing system further includes at least one of the components 2004, 2006, 2008, and/or 2010. The components may be software modules running in the processor 2106, resident/stored in the computer readable medium/memory 2108, one or more hardware modules coupled to the processor 2106, or some combination thereof. The processing system 2102 may be a component of the base station 110 and may include the memory 242 and/or at least one of the TX MIMO processor 230, the RX processor 238, and/or the controller/processor 240.

In some aspects, the apparatus 2002/2002' for wireless communication includes means for determining a timing adjustment for a sidelink connection between a first UE and a second UE; means for receiving sidelink feedback from the first UE on the uplink connection; means for transmitting information identifying the timing adjustment via radio resource control signaling; means for scheduling the sidelink feedback in accordance with the particular direction and based at least in part on identifying a slot offset between the sidelink connection and the uplink connection; and/or the like. The aforementioned means may be one or more of the aforementioned components of the apparatus 2002 and/or the processing system 2102 of the apparatus 2002' configured to perform the functions recited by the aforementioned means. As described elsewhere herein, the processing system 2102 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 21 is provided as an example. Other examples may differ from what is described in connection with FIG. 21.

The following provides an overview of some Aspects of the present disclosure:

Aspect 1: A method of wireless communication performed by a first user equipment (UE), comprising: receiving sidelink feedback on a sidelink connection with a second UE; and providing the sidelink feedback on an uplink resource via an uplink connection with a base station, wherein the uplink resource is separated, in time, from a sidelink resource on which the sidelink feedback is received by at least a minimum processing time, wherein the minimum processing time is based at least in part on respective parameters associated with the sidelink connection and the uplink connection.

Aspect 2: The method of Aspect 1, wherein the sidelink feedback is received on a physical sidelink feedback channel (PSFCH) and the uplink resource is associated with a physical uplink control channel (PUCCH), and wherein the minimum processing time is between an end of the PSFCH and a start of the PUCCH.

Aspect 3: The method of one or more of the previous Aspects, wherein the respective parameters comprise at least one of respective subcarrier spacings or respective minimum processing time capabilities associated with the sidelink connection and the uplink connection.

Aspect 4: The method of one or more of the previous Aspects, wherein the minimum processing time is determined based at least in part on at least one of a subcarrier spacing associated with the uplink connection or a minimum processing time capability associated with the uplink connection.

Aspect 5: The method of one or more of the previous Aspects, wherein the minimum processing time is determined based at least in part on at least one of a subcarrier spacing associated with the sidelink connection or a minimum processing time capability associated with the sidelink connection.

Aspect 6: The method of one or more of the previous Aspects, wherein the minimum processing time is determined based at least in part on a smallest subcarrier spacing of the uplink connection and the sidelink connection, and based at least in part on a minimum processing time capability of the uplink connection.

Aspect 7: The method of one or more of the previous Aspects, wherein the minimum processing time is determined based at least in part on a smallest subcarrier spacing of the uplink connection and the sidelink connection, and based at least in part on a minimum processing time capability of the sidelink connection.

Aspect 8: The method of one or more of the previous Aspects, wherein the minimum processing time is determined based at least in part on a smallest subcarrier spacing of the uplink connection and the sidelink connection, wherein the minimum processing time is determined based at least in part on a slower minimum processing time capability if one or more of the sidelink connection and the uplink connection are configured with the slower minimum processing time capability, and wherein the minimum processing time is determined based at least in part on a faster minimum processing time capability if the sidelink connection and the uplink connection are configured with the faster minimum processing time capability.

Aspect 9: The method of one or more of the previous Aspects, wherein the minimum processing time is selected from respective minimum processing times of the uplink connection and the sidelink connection.

Aspect 10: The method of one or more of the previous Aspects, wherein the minimum processing time is configured as a semi-static value.

Aspect 11: A method of wireless communication performed by a base station, comprising: configuring, for a first user equipment (UE), a sidelink resource for sidelink feedback on a sidelink connection between the first UE and a second UE; configuring, for the first UE, an uplink resource for the sidelink feedback on an uplink connection between the base station and the first UE, wherein the uplink resource is separated, in time, from the sidelink resource by at least a minimum processing time, wherein the minimum processing time is based at least in part on respective parameters associated with the sidelink connection and the uplink connection; and receiving the sidelink feedback on the uplink resource.

Aspect 12: The method of Aspect 11, wherein the sidelink resource is associated with a physical sidelink feedback channel (PSFCH) and the uplink resource is associated with a physical uplink control channel (PUCCH), and wherein the minimum processing time is between an end of the PSFCH and a start of the PUCCH.

Aspect 13: The method of one or more of Aspects 11 and 12, wherein the respective parameters comprise at least one of respective subcarrier spacings or respective minimum processing time capabilities associated with the sidelink connection and the uplink connection.

Aspect 14: The method of one or more of Aspects 11 through 13, wherein the minimum processing time is determined based at least in part on at least one of a subcarrier spacing associated with the uplink connection or a minimum processing time capability associated with the uplink connection.

Aspect 15: The method of one or more of Aspects 11 through 14, wherein the minimum processing time is determined based at least in part on at least one of a subcarrier spacing associated with the sidelink connection or a minimum processing time capability associated with the sidelink connection.

Aspect 16: The method of one or more of Aspects 11 through 15, wherein the minimum processing time is determined based at least in part on a smallest subcarrier spacing of the uplink connection and the sidelink connection, and based at least in part on a minimum processing time capability of the uplink connection.

Aspect 17: The method of one or more of Aspects 11 through 16, wherein the minimum processing time is determined based at least in part on a smallest subcarrier spacing of the uplink connection and the sidelink connection, and based at least in part on a minimum processing time capability of the sidelink connection.

Aspect 18: The method of one or more of Aspects 11 through 17, wherein the minimum processing time is determined based at least in part on a smallest subcarrier spacing of the uplink connection and the sidelink connection, wherein the minimum processing time is determined based at least in part on a slower minimum processing time capability if one or more of the sidelink connection and the uplink connection are configured with the slower minimum processing time capability, and wherein the minimum processing time is determined based at least in part on a faster minimum processing time capability if the sidelink connection and the uplink connection are configured with the faster minimum processing time capability.

Aspect 19: The method of one or more of Aspects 11 through 18, wherein the minimum processing time is selected from respective minimum processing times of the uplink connection and the sidelink connection.

Aspect 20: The method of one or more of Aspects 11 through 19, wherein the minimum processing time is configured as a semi-static value.

Aspect 21: A method of wireless communication performed by a first user equipment (UE), comprising: applying a timing adjustment for a sidelink connection with a second UE, wherein the timing adjustment causes a slot structure on the sidelink connection to align with a slot structure on an uplink connection with a base station; and transmitting sidelink feedback, received via the sidelink connection, on the uplink connection, wherein the sidelink feedback is mapped to a slot on the uplink connection, of two or more slots that the sidelink feedback overlaps, based at least in part on a rule.

Aspect 22: The method of Aspect 21, wherein the timing adjustment indicates whether to move the slot structure on the sidelink connection forward or backward in time.

Aspect 23: The method of one or more of Aspects 21 and 22, further comprising: receiving information identifying the timing adjustment via radio resource control signaling.

Aspect 24: The method of one or more of Aspects 21 through 23, wherein the first UE is pre-configured to move the slot structure on the sidelink connection in a particular direction, and wherein scheduling information associated with the sidelink feedback is based at least in part on the particular direction.

Aspect 25: The method of one or more of Aspects 21 through 24, wherein the rule indicates that the slot on the uplink connection is an earliest slot of the two or more slots.

Aspect 26: The method of one or more of Aspects 21 through 25, wherein the rule indicates that the slot on the uplink connection is a latest slot of the two or more slots.

Aspect 27: The method of one or more of Aspects 21 through 26, wherein the rule indicates that the slot on the uplink connection is a slot, of the two or more slots, associated with a largest overlap with a sidelink slot in which the sidelink feedback was received.

Aspect 28: The method of one or more of Aspects 21 through 27, wherein the slot on the uplink connection is a selected slot, and wherein the method further comprises: determining that a gap between a scheduled slot on the uplink connection that is scheduled for the sidelink feedback, and a sidelink slot in which the sidelink feedback is received, fails to satisfy a threshold; and selecting the selected slot based at least in part on a gap between the sidelink slot and the selected slot satisfying the threshold.

Aspect 29: A method of wireless communication performed by a base station, comprising: determining a timing adjustment for a sidelink connection between a first user equipment (UE) and a second UE, wherein the timing adjustment causes a slot structure on the sidelink connection to align with a slot structure on an uplink connection between the base station and the first UE; and receiving sidelink feedback from the first UE on the uplink connection, wherein the sidelink feedback is mapped to a slot on the uplink connection, of two or more slots that the sidelink feedback overlaps, based at least in part on a rule.

Aspect 30: The method of Aspect 29, wherein the timing adjustment indicates whether to move the slot structure on the sidelink connection forward or backward in time.

Aspect 31: The method of one or more of Aspects 29 and 30, further comprising: transmitting information identifying the timing adjustment via radio resource control signaling.

Aspect 32: The method of one or more of Aspects 29 through 31, wherein the first UE is pre-configured to move the slot structure on the sidelink connection in a particular direction, and wherein the method further comprises: scheduling the sidelink feedback in accordance with the particular direction and based at least in part on identifying a slot offset between the sidelink connection and the uplink connection.

Aspect 33: The method of one or more of Aspects 29 through 32, wherein the rule indicates that the slot on the uplink connection is an earliest slot of the two or more slots.

Aspect 34: The method of one or more of Aspects 29 through 33, wherein the rule indicates that the slot on the uplink connection is a latest slot of the two or more slots.

Aspect 35: The method of one or more of Aspects 29 through 34, wherein the rule indicates that the slot on the uplink connection is a slot, of the two or more slots, associated with a largest overlap with a sidelink slot in which the sidelink feedback was received.

Aspect 31: An apparatus for wireless communication at a device, comprising a processor; memory coupled with the processor; and instructions stored in the memory and executable by the processor to cause the apparatus to perform the method of one or more Aspects of Aspects 1-35.

Aspect 32: A device for wireless communication, comprising a memory and one or more processors coupled to the memory, the memory and the one or more processors configured to perform the method of one or more Aspects of Aspects 1-35.

Aspect 33: An apparatus for wireless communication, comprising at least one means for performing the method of one or more Aspects of Aspects 1-35.

Aspect 34: A non-transitory computer-readable medium storing code for wireless communication, the code comprising instructions executable by a processor to perform the method of one or more Aspects of Aspects 1-35.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-35.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
applying a timing adjustment for a sidelink connection with a second UE, wherein the applying of the timing adjustment shifts slot boundaries on the sidelink connection to be aligned with slot boundaries on an uplink connection with a base station; and
transmitting sidelink feedback, received via the sidelink connection, on the uplink connection based at least in part on the timing adjustment, wherein the sidelink feedback overlaps a plurality of slots on the uplink connection, and wherein the sidelink feedback is mapped to a slot on the uplink connection, of the plurality of slots, based at least in part on a rule indicating that the slot on the uplink connection is a latest slot of the plurality of slots.

2. The method of claim 1, wherein the timing adjustment indicates whether to move the slot boundaries on the sidelink connection forward or backward in time.

3. The method of claim 1, further comprising:
receiving information identifying the timing adjustment via radio resource control signaling.

4. The method of claim 1, wherein scheduling information associated with the sidelink feedback is based at least in part on a particular direction in which the first UE is pre-configured to move the slot boundaries on the sidelink connection to align with the slot boundaries on the uplink connection.

5. A method of wireless communication performed by a base station, comprising:
identifying a timing adjustment for a sidelink connection between a first user equipment (UE) and a second UE, wherein an applying of the timing adjustment shifts slot boundaries on the sidelink connection to be aligned with slot boundaries on an uplink connection between the base station and the first UE; and
receiving sidelink feedback from the first UE on the uplink connection based at least in part on the timing adjustment, wherein the sidelink feedback overlaps a plurality of slots on the uplink connection, and wherein the sidelink feedback is mapped to a slot on the uplink connection, of the plurality of slots, based at least in part on a rule indicating that the slot on the uplink connection is a latest slot of the plurality of slots.

6. The method of claim 5, wherein the timing adjustment indicates whether to move the slot boundaries on the sidelink connection forward or backward in time.

7. The method of claim 5, further comprising:
transmitting information identifying the timing adjustment via radio resource control signaling.

8. The method of claim 5, wherein the method further comprises:
scheduling the sidelink feedback in accordance with a particular direction in which the slot boundaries on the sidelink connection is pre-configured to move as a result of the timing adjustment and based at least in part on identifying a slot offset between the sidelink connection and the uplink connection.

9. A first user equipment (UE) for wireless communication, comprising:
one or more memories; and
one or more processors, coupled to the one or more memories, configured to:
apply a timing adjustment for a sidelink connection with a second UE, wherein an applying of the timing adjustment shifts slot boundaries on the sidelink connection to be aligned with slot boundaries on an uplink connection with a base station; and
transmit sidelink feedback, received via the sidelink connection, on the uplink connection, wherein the sidelink feedback overlaps a plurality of slots on the uplink connection, and wherein the sidelink feedback is mapped to a slot on the uplink connection, of the plurality of slots based at least in part on a rule indicating that the slot on the uplink connection is a latest slot of the plurality of slots.

10. The first UE of claim 9, wherein the timing adjustment indicates whether to move the slot boundaries on the sidelink connection forward or backward in time.

11. The first UE of claim 9, wherein the one or more processors are configured to:
receive information identifying the timing adjustment via radio resource control signaling.

12. The first UE of claim 9, wherein the first UE is pre-configured to move the slot boundaries on the sidelink connection in a particular direction to align with the slot boundaries on the uplink connection, and wherein scheduling information associated with the sidelink feedback is based at least in part on the particular direction.

13. A base station for wireless communication, comprising:
one or more memories; and
one or more processors, coupled to the one or more memories, configured to:
determine a timing adjustment for a sidelink connection between a first user equipment (UE) and a second UE, wherein an applying of the timing adjustment shifts slot boundaries on the sidelink connection to be aligned with slot boundaries on an uplink connection between the base station and the first UE; and
receive sidelink feedback from the first UE on the uplink connection, wherein the sidelink feedback overlaps a plurality of slots on the uplink connection, and wherein the sidelink feedback is mapped to a slot on the uplink connection, of the plurality of slots, based at least in part on a rule indicating that the slot on the uplink connection is a latest slot of the plurality of slots.

14. The base station of claim 13, wherein the timing adjustment indicates whether to move the slot boundaries on the sidelink connection forward or backward in time.

15. The base station of claim 13, wherein the one or more processors are configured to:
transmitting information identifying the timing adjustment via radio resource control signaling.

16. The base station of claim 13, wherein the one or more processors are configured to:
schedule the sidelink feedback in accordance with a particular direction in which the slot boundaries on the sidelink connection is pre-configured to move as a result of the timing adjustment and based at least in part on identifying a slot offset between the sidelink connection and the uplink connection.

17. The method of claim 1, wherein the uplink connection and the sidelink connection are associated with different subcarrier spacing values.

18. The method of claim 1, wherein the sidelink feedback includes hybrid automatic repeat request (HARQ) feedback.

19. The method of claim 1, wherein the sidelink feedback is transmitted to the base station on an uplink resource separated, in time, from a sidelink resource on which the first UE receives the sidelink feedback from the second UE.

20. The method of claim 1, wherein the uplink connection and the sidelink connection are associated with different minimum processing time capabilities.

21. The method of claim 5, wherein the uplink connection and the sidelink connection are associated with different subcarrier spacing values.

22. The method of claim 5, wherein the sidelink feedback includes hybrid automatic repeat request (HARQ) feedback.

23. The method of claim 5, wherein the sidelink feedback is received from the first UE on an uplink resource separated, in time, from a sidelink resource on which the first UE receives the sidelink feedback from the second UE.

24. The first UE of claim 9, wherein the uplink connection and the sidelink connection are associated with different subcarrier spacing values.

25. The first UE of claim 9, wherein the sidelink feedback includes hybrid automatic repeat request (HARQ) feedback.

26. The first UE of claim 9, wherein the sidelink feedback is transmitted to the base station on an uplink resource separated, in time, from a sidelink resource on which the first UE receives the sidelink feedback from the second UE.

27. The base station of claim 13, wherein the uplink connection and the sidelink connection are associated with different subcarrier spacing values.

28. The base station of claim 13, wherein the sidelink feedback includes hybrid automatic repeat request (HARQ) feedback.

29. The base station of claim 13, wherein the sidelink feedback is received from the first UE on an uplink resource separated, in time, from a sidelink resource on which the first UE receives the sidelink feedback from the second UE.

30. The base station of claim 13, wherein the uplink connection and the sidelink connection are associated with different minimum processing time capabilities.

* * * * *